(12) United States Patent
Das et al.

(10) Patent No.: US 8,583,142 B2
(45) Date of Patent: Nov. 12, 2013

(54) SELECTIVE DISTRIBUTION OF LOCATION BASED SERVICE CONTENT TO MOBILE DEVICES

(75) Inventors: Saumitra Mohan Das, San Jose, CA (US); Behrooz Khorashadi, Mountain View, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/423,038

(22) Filed: Mar. 16, 2012

(65) Prior Publication Data

US 2013/0244624 A1    Sep. 19, 2013

(51) Int. Cl.
    *H04M 11/04*    (2006.01)
(52) U.S. Cl.
    USPC ............... 455/456.1; 455/456.5; 455/456.6
(58) Field of Classification Search
    USPC ............. 455/404.2, 414.1, 414.2, 420, 422.1, 455/432.3, 435.1, 435.3, 456.1, 456.2, 455/456.3, 456.5, 456.6; 342/357.1, 342/357.11, 357.15; 709/225, 226, 229; 701/213, 214, 215
    See application file for complete search history.

(56) References Cited

U.S. PATENT DOCUMENTS

| 6,438,382 | B1 | 8/2002 | Boesch et al. | |
|---|---|---|---|---|
| 7,149,534 | B2 | 12/2006 | Bloebaum et al. | |
| 7,917,156 | B2 | 3/2011 | Sheynblat | |
| 2007/0293237 | A1* | 12/2007 | Correal et al. | ............. 455/456.1 |
| 2008/0188261 | A1 | 8/2008 | Arnone | |
| 2009/0197612 | A1* | 8/2009 | Kiiskinen | ................ 455/456.1 |
| 2009/0248833 | A1 | 10/2009 | Frazier et al. | |
| 2009/0319612 | A1* | 12/2009 | Matsuo | ......................... 709/204 |
| 2010/0150120 | A1* | 6/2010 | Schlicht et al. | ............... 370/338 |
| 2011/0142016 | A1 | 6/2011 | Chatterjee | |
| 2011/0190004 | A1 | 8/2011 | Tenny et al. | |
| 2011/0291882 | A1* | 12/2011 | Walsh et al. | ............. 342/357.29 |
| 2012/0249372 | A1* | 10/2012 | Jovicic et al. | ................. 342/451 |
| 2013/0045758 | A1* | 2/2013 | Khorashadi et al. | ....... 455/456.3 |
| 2013/0079028 | A1* | 3/2013 | Klein | ......................... 455/456.1 |

FOREIGN PATENT DOCUMENTS

EP    2320624 A1    5/2011
WO    2010052496 A1    5/2010

OTHER PUBLICATIONS

International Search Report and Written Opinion—PCT/US2013/026949—ISA/EPO—May 5, 2013.

* cited by examiner

*Primary Examiner* — Jean Gelin
(74) *Attorney, Agent, or Firm* — Berkeley Law & Technology Group, LLP

(57) ABSTRACT

Methods, apparatuses and/or articles of manufacture are provided that selectively distribute location based service content for use by mobile devices with regard to certain indoor environment(s). In one example implementation, one or more computing devices generate data files that collectively represent an initial content for use by a mobile device with regard to an indoor environment, wherein at least one of the data files is generated based, at least in part, on one or more distribution schemes relating to the indoor environment. The one or more computing devices selectively initiates transmission of an indication to one or more mobile devices identifying that a shared data file corresponding to a seeded data file may be obtained from a first mobile device. The first mobile device and/or one or more of the other mobile devices may be identified based, at least in part, on the one or more distribution schemes.

90 Claims, 7 Drawing Sheets

SELECTIVE DISTRIBUTION OF LOCATION BASED SERVICE CONTENT TO MOBILE DEVICES

FIELD

The subject matter disclosed herein relates to electronic devices, and more particularly to methods, apparatuses and articles of manufacture for use in selectively distributing location based service content to mobile devices.

INFORMATION

Mobile devices, such as mobile phones, notebook, computers, etc., typically have the ability to estimate location and/or position with a high degree of precision using any one of several technologies such as, for example, satellite positioning systems (e.g., GPS and the like), advanced forward-link trilateration (AFLT), just to name a few examples. Using high precision location information, applications for a mobile device may provide a user with may different services such as, for example, vehicle/pedestrian navigation, location-based searching, just to name a couple of examples. Here, high precision location information (e.g., obtained from GPS and/or the like) may be processed according to a global coordinate system (e.g., latitude and longitude or earth-centered xyz coordinates). While such use of location information referenced to a global coordinate system may be useful in providing some services (e.g., outdoor vehicle navigation), such location information referenced to a global coordinate system may be impractical for other types of services such as indoor pedestrian navigation.

In certain instances, a mobile device moving into an area (such as an indoor environment) may contact a server to obtain location based service content for the indoor environment. Such a request from the mobile device may include, for example, an indication of a rough location of the mobile device which is determined to be in the area. The requested location based service content may include, for example, positioning assistance data, an encoded electronic map for indoor environment, locations of transmitters for use in positioning operations, radio heatmap data, routeability graphs, probability heatmap data, location/venue/event related information, and/or the like or some combination thereof, just to name a few. While providing location based service content to a single requesting mobile device may not significantly impact server resources, it may end up that a mobile device is provided with more data than may have been needed/desired, a significant amount of time may be required, and/or a significant amount of a limited download data budget for the mobile device (user) may have been consumed. Further, while providing location based service content to a single requesting mobile device may not significantly impact server resources, servicing a high number of such requests from multiple mobile devices roughly at the same time may overwhelm a server's ability to service such requests and provide requested information in a timely/useful manner. Such a condition may arise, for example, under particular situations where multiple individuals (users) may be newly arriving to an area at the same time, e.g., such as passengers deboarding an airliner and entering a terminal. Here, a server (e.g., local, regional, national, etc.) and/or local transmitting resources may not be capable of efficiently providing the entirety of all requested positioning assistance data to all requesting mobile devices. Hence, further techniques for use in distributing location based service content may prove useful.

SUMMARY

In accordance with one aspect, a method may be provided which comprises, with at least one computing device: generating a plurality of data files that collectively represent an initial location based service content for use by a mobile device with regard to at least one indoor environment, wherein at least one of the plurality of data files is generated based, at least in part, on one or more distribution schemes relating to the at least one indoor environment; initiating transmission of at least one of the plurality of data files, as a seeded data file, to a first mobile device; determining that a second mobile device is estimated to be currently located within the at least one indoor environment, or is expected to be located within the at least one indoor environment within a threshold period of time; and initiating transmission of an indication to the second mobile device, the indication identifying at least the first mobile device as a peer device from which a shared data file corresponding to the seeded data file may be obtained, the shared data file comprising or being based, at least in part, on the seeded data file, and wherein at least one of the first mobile device or the second mobile device are identified based, at least in part, on at least one of the one or more distribution schemes.

In accordance with another aspect, an apparatus may be provided for use in at least one computing device. The apparatus may comprise: means for generating a plurality of data files that collectively represent an initial location based service content for use by a mobile device with regard to at least one indoor environment, wherein at least one of the plurality of data files is generated based, at least in part, on one or more distribution schemes relating to the at least one indoor environment; means for transmitting at least one of the plurality of data files, as a seeded data file, to a first mobile device; means for determining that a second mobile device is estimated to be located within the at least one indoor environment or is expected to be located within the at least one indoor environment within a threshold period of time; and means for transmitting an indication to the second mobile device, the indication identifying at least the first mobile device as a peer device from which a shared data file corresponding to the seeded data file may be obtained, the shared data file comprising or being based, at least in part, on the seeded data file; and means for identifying at least one of the first mobile device or the second mobile device based, at least in part, on at least one of the one or more distribution schemes.

In accordance with yet another aspect, a device may be provided which comprises: a communication interface; and one or more processing units to: generate a plurality of data files that collectively represent an initial location based service content for use by a mobile device with regard to at least one indoor environment, wherein at least one of the plurality of data files is generated based, at least in part, on one or more distribution schemes relating to the at least one indoor environment; initiate transmission, via the communication interface, of at least one of the plurality of data files, as a seeded data file, to a first mobile device; and determine that a second mobile device is estimated to be located within the at least one indoor environment or is expected to be located within the at least one indoor environment within a threshold period of time; initiate transmission, via the communication interface, of an indication to the second mobile device, the indication identifying at least the first mobile device as a peer device from which a shared data file corresponding to the seeded data file may be obtained, the shared data file comprising or being based, at least in part, on the seeded data file, and wherein at least one of the first mobile device or the second mobile device are identified by the one or more processing units based, at least in part, on at least one of the one or more distribution schemes.

In accordance with yet another aspect, in article of manufacture may be provided for use in at least one computing device. The article of manufacture may comprise: a non-transitory computer readable medium having stored therein computer implementable instructions executable by one or more processing units to: generate a plurality of data files that collectively represent an initial location based service content for use by a mobile device with regard to at least one indoor environment, wherein at least one of the plurality of data files is generated based, at least in part, on one or more distribution schemes relating to the at least one indoor environment; initiate transmission of at least one of the plurality of data files, as a seeded data file, to a first mobile device; determine that a second mobile device is estimated to be located within the at least one indoor environment or is expected to be located within the at least one indoor environment within a threshold period of time; and initiate transmission of an indication to the second mobile device, the indication identifying at least the first mobile device as a peer device from which a shared data file corresponding to the seeded data file may be obtained, the shared data file comprising or being based, at least in part, on the seeded data file, and wherein at least one of the first mobile device or the second mobile device are identified based, at least in part, on at least one of the one or more distribution schemes.

In accordance with still another aspect, a method may be provided which comprises, with a mobile device: obtaining at least a first data file that comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; obtaining an indication that at least a second mobile device is to receive a shared data file that is based, at least in part, on at least a part of the first data file, the indication being based, at least in part, on the one or more distribution schemes relating to the at least one indoor environment; and initiating transmission of the shared data file to the second mobile device that is estimated to be located within the at least one indoor environment or is expected to be located within the at least one indoor environment within a threshold period of time.

In accordance with a yet another aspect, an apparatus may be provided for use in a mobile device. The apparatus may comprise: means for obtaining at least a first data file that comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; means for obtaining an indication that at least a second mobile device is to receive a shared data file that is based, at least in part, on at least a part of the first data file, the indication being based, at least in part, on the one or more distribution schemes relating to the at least one indoor environment; and means for initiating transmission of the shared data file to the second mobile device that is estimated to be located within the at least one indoor environment or is expected to be located within the at least one indoor environment within a threshold period of time.

In accordance with still another aspect, a mobile device may be provided which comprises: a communication interface; and one or more processing units to: obtain, via the communication interface, at least a first data file that comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; obtain, via the communication interface, an indication that at least a second mobile device is to receive a shared data file that is based, at least in part, on at least a part of the first data file, the indication being based, at least in part, on the one or more distribution schemes relating to the at least one indoor environment; and initiate transmission of the shared data file, via the communication interface, to the second mobile device that is estimated to be located within the at least one indoor environment or is expected to be located within the at least one indoor environment within a threshold period of time.

In accordance with one aspect, in article of manufacture may be provided which comprises: a non-transitory computer readable medium having stored therein computer implementable instructions executable by one or more processing units in a mobile device to: obtain at least a first data file that comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; obtain an indication that at least a second mobile device is to receive a shared data file that is based, at least in part, on at least a part of the first data file, the indication being based, at least in part, on the one or more distribution schemes relating to the at least one indoor environment; and initiate transmission of the shared data file to the second mobile device that is estimated to be located within the at least one indoor environment or is expected to be located within the at least one indoor environment within a threshold period of time.

In accordance with one other aspect, a method may be provided which comprises, with a mobile device: obtaining an indication that the mobile device is to receive a shared data file that comprises or is based, at least in part, on at least a part of a first data file, wherein the first data file comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; initiating transmission of a request that is based, at least in part, on the indication to at least a second mobile device that is estimated to be located within the at least one indoor environment or is expected to be located within the at least one indoor environment within a threshold period of time; and receiving the shared data file over a wireless communication link from the second mobile device.

In accordance with still another aspect apparatus may be provided for use in a mobile device. The apparatus may comprise: means for obtaining an indication that the mobile device is to receive a shared data file that comprises or is based, at least in part, on at least a part of a first data file, wherein the first data file comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; means for transmitting a request that is based, at least in part, on the indication to at least a second mobile device that is estimated to be located within the at least one indoor environment or is expected to be located within the at least one indoor environment within a threshold period of time; and means for receiving the shared data file over a wireless communication link from the second mobile device.

In accordance with still another aspect, a mobile device may be provided which comprises: a communication interface; and one or more processing units to: obtain, via the communication interface, an indication that the mobile device is to receive a shared data file that comprises or is based, at least in part, on at least a part of a first data file, wherein the first data file comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; initiate transmission, via the communication interface, of a request that is based, at least in part, on the indication to at least a second mobile device that is estimated to be located within the at least one indoor environment or is expected to be located within the at least one indoor environment within a threshold period of time; and receive, via the communication interface, the shared data file over a wireless communication link from the second mobile device.

In accordance with yet another aspect, in article of manufacture may be provided which comprises: a non-transitory computer readable medium having stored therein computer implementable instructions executable by one or more processing units of a mobile device to: obtain an indication that the mobile device is to receive a shared data file that comprises or is based, at least in part, on at least a part of a first data file, wherein the first data file comprises or is based, at least in part, on at least one of a plurality of seeded data files that collectively represent an initial location based service content for use by the mobile device with regard to at least one indoor environment, wherein at least one of the plurality of seeded data files was generated based, at least in part, on one or more distribution schemes relating to the at least one indoor environment; initiate transmission of a request that is based, at least in part, on the indication to at least a second mobile device that is estimated to be located within the at least one indoor environment or is expected to be located within the at least one indoor environment within a threshold period of time; and receive the shared data file over a wireless communication link from the second mobile device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
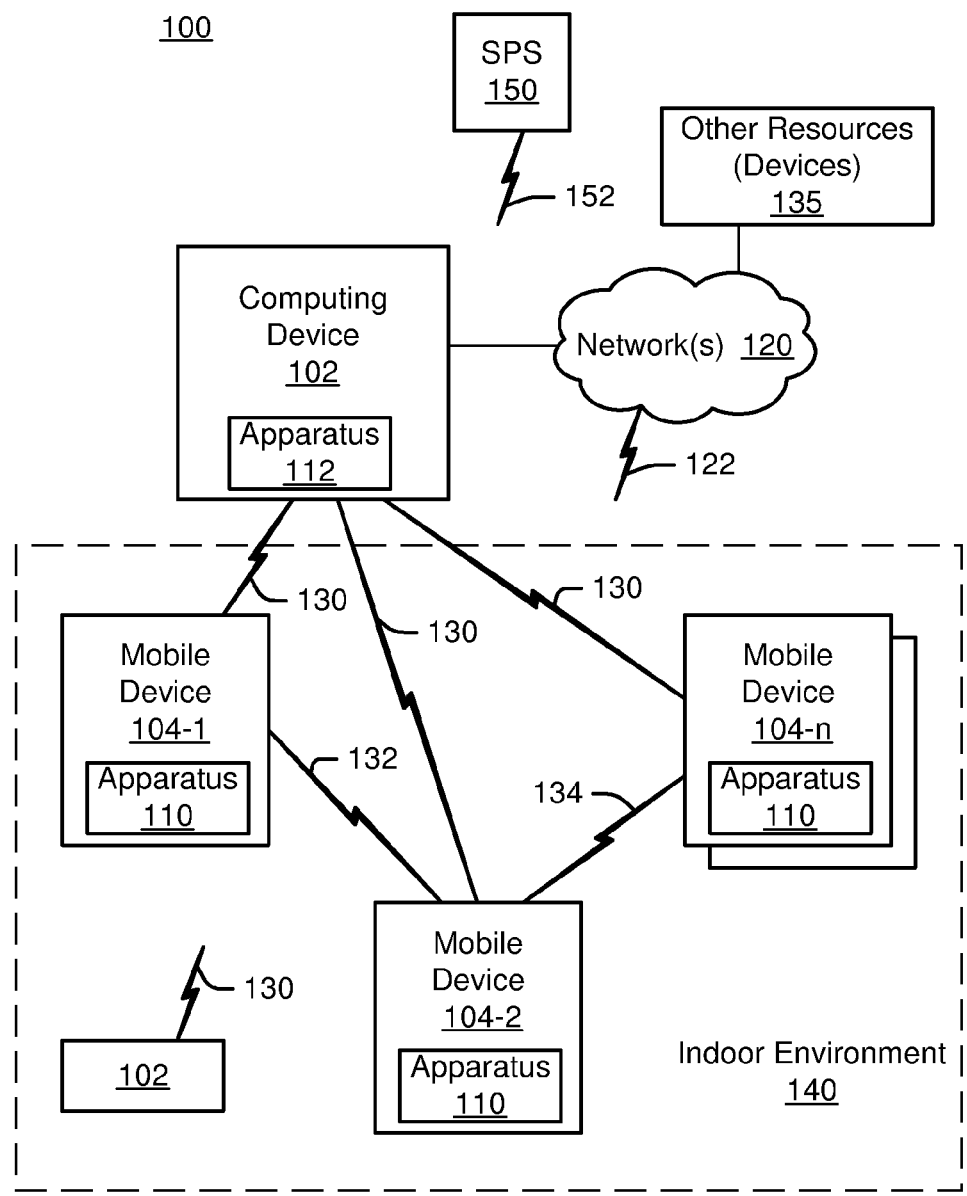
FIG. 1 is a schematic block diagram illustrating an example environment that includes a computing device and a plurality of mobile devices for use in selectively distributing location based service content, in accordance with an implementation.

In accordance with certain example implementations, one or more computing devices may be provided to selectively distribute location based service content for use by mobile devices with regard to one or more indoor environments. The location based service content may be divided or otherwise processed in some manner to generate a plurality of data files, which will be referred to herein as "seeded" data files. All or some of the plurality of seeded data files may be distributed to one or more mobile devices, e.g., over one or more wireless and/or wired communication links. For example, a computing device may selectively transmit a seeded data file to a particular mobile device which may subsequently provide a "shared" data file (e.g., which may comprise the seeded data file and/or be based at least in part on the seeded data file) to one or more other mobile devices. Additionally, such particular mobile device may itself subsequently receive one or more other shared data files from various other mobile devices. In this manner, for example, it may be possible to selectively and possibly efficiently distribute location based service content or at least portions thereof, to mobile devices which may be located or may be expected to become located within certain indoor environments without overburdening the one or more computing devices (e.g. one or more servers, etc.). As illustrated herein, one or more distribution schemes may be used to control the distribution of the location based service content or at least portions thereof to mobile devices and/or sharing of information based, at least in part, on one or more distribution schemes that may be established, affected, promulgated, and/or otherwise controlled in some manner by one or more computing devices.

As presented in the examples herein, various techniques are provided that may be implemented within one or more computing devices, and/or one or more mobile devices to allow for controlled distribution of location based service content with regard to one or more indoor environments.

By way of an initial example, a computing device may be provided to generate a plurality of data files that collectively represent an initial location based service content for use by a mobile device with regard to at least one indoor environment. By way of example, one or more of the plurality of data files may be generated based, at least in part, on one or more distribution schemes relating to said at least one indoor environment. The computing device may initiate transmission of at least one of the plurality of data files, as a seeded data file, to a first mobile device that is estimated to be located within the indoor environment or may be expected to be located within the indoor environment within a threshold period of time. The computing device may determine that a second mobile device is estimated to be located within the indoor environment or may be expected to be located within the indoor environment within the threshold period of time. The computing device may initiate transmission of an indication to the second mobile device, which may identify at least the first mobile device as representing a potential peer device from which a shared data file corresponding to said seeded data file may be obtained. In certain instances, the shared data file may comprise the seeded data file. In certain instances, the shared data may be generated based, at least in part, on the seeded data file. The computing device may identify at least one of the first mobile device or second mobile device based, at least in part, on one or more of the distribution schemes. Further, in certain example implementations the computing device may selectively initiate transmission of a seeded data file to a first mobile device, and/or indication to the second mobile device based, at least in part, on one or more of the distribution schemes.

The use of one or more distribution schemes may be beneficial not only in controlling the distribution of location based service content via such seeded data files and/or shared data files, but may also generate such data files to begin with. For example, in certain example implementations at least one of the plurality of seeded data files may be determined based, at least in part, on at least one of the one or more distribution schemes. Further, one or more such distribution schemes may be further considered by the computing device in selecting the various mobile devices that are to receive seeded data files or shared data files. Further, one or more such distribution schemes may be further considered by the computing device to determine when to initiate a transmission of one or more seeded data files and/or other information corresponding to the distribution process. Further still, one or more such distributional schemes may be further considered by the mobile device to determine when to initiate transmission of one or more shared data files, and/or other like information corresponding to the distribution process.

Several example distribution schemes are presented herein, one or more of which may be implemented by a computing device and/or via one or more mobile devices. For example, one or more distribution schemes may comprise a tracking scheme that may be based, at least in part, on estimated location(s), trajectories, ranges, etc., of the various mobile devices. Thus, for example, if an estimated location and/or other like information relating to a particular mobile device places the mobile device within a particular indoor environment or possibly moving in a direction towards it particular indoor environment, the computing device may determine that one or more particular seeded data files and/or shared files may be of use to the mobile device (e.g., for use by one or more applications and/or functions of the mobile device, and/or for use in some manner by a user of the mobile device) with regard to the indoor environment(s). In another example, if an estimated location and/or other like information relating to a particular mobile device places the mobile device within a particular indoor environment or possibly moving in a direction towards it particular indoor environment, one or more other mobile devices may determine and/or learn that one or more shared files may be of use to the mobile device with regard to a particular indoor environment.

In certain example implementations, one or more distribution schemes may comprise a tile-based distribution scheme that may be based, at least in part, on an electronic map and/or the like of the indoor environment. For example, in certain instances, an electronic map and/or other like information for an indoor environment may be subdivided according to a particular pattern or formula to generate an array of adjacent tiles. In another example, an electronic map of an airport may be divided in some manner into tiles which may relate to particular regions of the airport (e.g., arriving/departing passenger regions, concourse regions, cargo delivery/pickup regions, non-passenger regions, etc.), particular service-related aspects of the airport (e.g., intra-airport transportation services/routes, passenger services, food services, etc.). In another example, an electronic map of an airport may be divided into tiles based, least in part, on an amount of available information within the electronic map for certain regions or other service-related aspects. In still another example, an electronic map of an airport may be divided into tiles based, at least in part, on expected traffic pattern further use information that may relate to certain users of the airport. For example, it may be useful to provide tiles relating to different shaped areas of the airport based on expected movements of users within such areas. In certain example instances, a tile-based distribution scheme may comprise two or more tiles that relate to different sized areas within an indoor environment. In certain example instances, a tile-based distribution scheme may comprise two or more tiles that relate to two or more areas within an indoor environment that may or may not overlap one another. Further, in certain example instances, a tile-based distribution scheme may comprise different tiles for different times/dates, different users, different mobile devices, etc.

In certain example implementations, one or more distribution schemes may comprise a data file size-based distribution scheme. Thus, for example, a seeded data file and/or related shared data file may be based on one or more data file size constraints and/or preferences. For example, certain instances a data file size-based distribution scheme may be based, at least in part, on some aspect relating to a wireless communication protocol that a mobile device may use.

Similarly, in certain example implementations one or more distribution schemes may comprise a peer device constraint-based distribution scheme. Thus, for example, a seeded data file and/or related shared data file may be based on one or more constraints and/or preferences associated with a particular mobile device which may act as a peer device to another mobile device as part of the location based service content distribution process. For example, a peer device constraint-based distribution scheme may be based, at least in part, on an amount of available memory in a particular mobile device, one or more particular processing capabilities in the particular mobile device, etc.

In certain example implementations, one or more distribution schemes may comprise a time-based distribution scheme. Thus, for example, a seeded data file and/or related shared data file may be based on at least one planned or otherwise anticipated event. For example, a time-based distribution scheme may be useful in an airport setting to initiate or otherwise schedule distribution of one or more data files and/or one or more related shared data files to certain mobile devices in advance of some events such as a scheduled flight arrival, scheduled flight departure, or possibly in response to some events such as a gate change, etc. For example, a time-based distribution scheme may be useful in a shopping mall which may have different configurations depending on a time of year, holiday season, etc. In another example, a time-based distribution scheme may be useful provide timely distribution of location based service information that may dynamically change.

In certain example implementations, one or more distribution schemes may comprise a user incentive reward-based distribution scheme that is based, at least in part, on at least one user reward system. For example, a user incentive reward-based distribution scheme may be based on a policy to reward mobile devices (users) that participate and act as sharing peer devices in the location based service content distribution process, and/or to incentivize other mobile devices (other users) to more often participate and act as a sharing peer device in the location based service content distribution process. In certain example implementations, a user incentive reward may relate to some form of preferential treatment over other mobile devices (other users) for certain services, some form of additional service to said mobile device or its user, etc. Hence, for example, one or more user incentive award(s) may be used to promote certain desired behaviors by mobile devices in furtherance of the selected/controlled peer to peer sharing of the location based service content within the data files and/or related shared data files. Thus one or more user incentive awards may be provided which relate to, or may be of interest to, a user of the mobile device. For example, a user of a mobile device may be interested in receiving some form of service or financial credits with regard to a service provider (e.g., a cellular service provider, a location based service provider, etc.). For example, a user of a mobile device may be interested in receiving an offer (sees e.g., a certificate, a coupon, a discount) for certain other goods and/or services.

In certain example implementations, one or more distribution schemes may comprise a user group distribution scheme. Thus, for example, certain data files and/or related shared data files may be distributed to and among certain mobile stations whose owners are believed to belong in some particular group. A user of a mobile device may, for example, be believed to belong to one or more groups based on one or more user attributes. For example, it may be beneficial to group users of mobile devices in an airport setting to distinguish between arriving and departing passengers, passengers headed to or from a particular region of the airport, and/or passengers and employees. Thus, for example, a user group distribution scheme to take into consideration particular contextual roles of users with regard to a particular indoor environment and/or services that might be associated with such indoor environment, etc. In another example, a user group distribution scheme may take into consideration certain demographic information that may be known or inferred with regard to a user of the mobile device. For example, in certain indoor environments there may be different location based service information for certain users, e.g., based on gender distinctions, age distinctions, etc. Further, groups of users may be determined based, at least in part, on contractual relationships with certain service providers, etc.

In certain example implementations, one or more distribution schemes may comprise a reciprocation scheme that may be based, at least in part, on one or more peer device sharing rules, a peer device sharing history, and/or the like. Thus, for example, a reciprocation scheme may alter a location based service content distribution and sharing process in some manner so as to avoid overuse and/or under use of a particular mobile device as a peer device transmitting shared data files to other peer devices. For example, a reciprocation scheme may invoke a sharing rule to limit a particular mobile device with regard to how often it transmits shared data files with other mobile devices, which may be determined based, at least in part, on its sharing history. Conversely, for example reciprocation scheme may invoke a sharing rule to limit the particular mobile device with regard to how often it receives shared data files from other peer mobile devices and how often it provides shared data files with other peer mobile devices, which too may be determined based, at least in part, on its sharing history. It should be clear that other fairness and/or policing rules may also be implemented as part of a reciprocation scheme or some other distribution scheme.

In certain example implementations, a computing device may selectively identify one or more mobile devices which are believed to have received a particular seeded data file and/or a related shared data file to a second mobile device in response to a request for such from the second mobile device.

In certain example implementations, a computing device may transmit one or more seeded data files to a mobile device over a wireless communication link using various applicable location protocols. For example, in certain instances a computing device may transmit a seeded data file to a mobile device using a wireless local area network protocol, a cellular communication protocol, etc. Moreover, in certain instances, a computing device may initiate transmission of a seeded data file to a mobile device via one or more interfaces using a peer-to-peer networking protocol, e.g. as may be used by the mobile devices themselves in sharing/distributing shared data files as presented by the techniques herein.

An initial example will now be presented with regard to a mobile device that may act as a peer device to another mobile device to share/distribute location based service content as presented by the techniques herein. A mobile device may, for example, obtain at least a first data file that comprises or is based, at least in part, on at least one of a plurality of seeded data files that collectively represent an initial location based service content for use by a mobile device with regard to at least one indoor environment here, for example, one or more of the seeded data files may have been generated based, at least in part, on one or more distribution schemes relating to the indoor environment(s). The mobile device may obtain an indication that at least a second mobile device is to receive a shared data file from the mobile device. The shared data file may be based, at least in part, on at least a part of the first data file. The indication that was obtained may have been based, at least in part, on at least one of the distribution schemes. The mobile device may initiate transmission of the shared data file to the second mobile device. Here for example, the second mobile device may be estimated to be located within the indoor environment or may be expected to be located within said at least one indoor environment within a threshold period of time.

In certain example implementations, the first data file may be received over a wired and/or wireless communication link from a computing device, e.g. as a seeded data file. In certain other example implementations, the first data file may be received over a wireless communication link from one or more other mobile devices, e.g. as a shared data file. In certain example implementations, the indication may be received from a computing device, the second mobile device, and/or one or more other mobile devices.

In certain other example implementations, a mobile device may generate a shared data file based, at least in part, on the at least the part of the first data file. For example, a mobile device may generate a shared data file from the first data file based, at least in part, on one or more distribution schemes. For example, in certain instances, a mobile device may obtain processing information from at least one other device, and generate a shared data file from the first data file based, at least in part, on the processing information. Thus, for example, a shared data file may be specifically configured for a particular application and/or function on the receiving mobile device.

An initial example will now be presented with regard to mobile device that may act as a peer device to another mobile device to receive location based service content as presented by the techniques herein. A mobile device may, for example, obtain at least one indication that the mobile device is to receive a shared data file from a second mobile device acting as a sharing peer device. Here, for example, a shared data file may comprise or may otherwise be based, at least in part, on at least a part of a first data file that the second mobile device has obtained. Further, for example, the first data file may comprise or may otherwise be based, at least in part, on a seeded data file, wherein a plurality of seeded data files collectively represent an initial location based service content for use by one or more mobile devices with regard to at least one indoor environment. Here, for example, at least one of the plurality of seeded data files may have been generated based, at least in part, on one or more distribution schemes relating to the indoor environment. The mobile device may initiate transmission of a request for the shared data file to the second mobile device. The request for the shared data file may be based, at least in part, on the obtained indication(s). Here, for example, the second mobile device may be estimated to be located within the indoor environment or may be expected to be located within the indoor environment within a threshold period of time. The mobile device may subsequently receive the shared data file over a wireless communication link from the second mobile device.

In certain example implementations, such an indication may be received by the mobile device from a computing device, and/or the second mobile device. In certain example implementations, a request may further comprise processing information, e.g. with regard to the mobile device and/or some application or function provided therein. As such, the shared data file may be generated or otherwise selected in some manner based, at least in part, on the processing information. As previously mentioned, in certain instances a shared data file relating to a first data file may or may not comprise the same data as the first data file. As pointed out in the example above, it may be beneficial to generate or otherwise select the shared data file based on processing information and/or the like relating to the intended recipient mobile device.

Attention is drawn next to FIG. 1, which is a schematic block diagram illustrating an example environment 100 wherein at least one computing device and a plurality of mobile devices are enabled to selectively distribute location based service content relating to at least one indoor environment in the form of one or more seeded data files and/or one or more shared data, in accordance with an implementation.

As shown, example environment 100 includes a computing device 102 comprising an apparatus 112 for use in selectively distributing location based service content relating to an indoor environment 140. Computing device 102 may represent one or more computing platforms which may communicate with one or more other devices, either directly and/or indirectly. For example computing device 102 may be coupled directly to one or more network(s) 120 via one or more wired and/or wireless communication links. As illustrated by way of a second labeled box within an indoor environment 140, in certain instances, all or part of computing device 102 may be physically located within indoor environment 140.

Network(s) 120 may comprise one or more communication systems and/or data networks having various interconnected devices supporting communication between computing device 102 and one or more other resources (devices) 135. Network(s) 120 may further support communication between computing device 102 in one or more mobile devices 104. For example, a wireless signal 122 as illustrated extending from network(s) 120 towards mobile devices 104 may represent one or more wired and/or wireless communication links there between. For the sake of simplicity in FIG. 1, wireless signals 130 are illustrated as traveling directly between computing device 102 and example mobile devices 104-1, 104-2, and 104-n. Wireless signals 130 are therefore intended to represent one or more wired or wireless communication links over which one or more seeded data files and/or other information may be selectively exchanged with one or more mobile devices.

As used herein a mobile device may represent any electronic device that may be moved about either directly or indirectly by a user within an indoor environment and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

While mobile devices 104-1, 104-2, and 104-n are each illustrated as comprising an apparatus 110 it should be understood that each apparatus 110 may be unique or otherwise specific to its applicable mobile device. Further, each of the mobile devices may be distinctly different from another in one or more ways. However configured, apparatus 110 in each of the mobile devices is intended to enable its respective mobile device to participate in the example location based service content distribution techniques as provided herein. Thus for example, in mobile device 104-1, apparatus 110 may enable mobile device 104-1 to obtain one or more seeded data files from computing device 102, e.g. via wireless signal(s) 130 and/or 122. Mobile device 104-1 may further communicate, as needed, with a computing device 102 regard to the location based service content distribution techniques provided herein by wireless signal(s) 130 and/or 122. Additionally, in mobile device 104-1, apparatus 110 may enable mobile device 104-1 to transmit and/or receive information from mobile device 104-2 (and/or other mobile devices), e.g. via communication link using one or more wireless signals 132. In certain instances, for example wireless signals 132 may make use of one or more peer to peer communication protocols. Thus, for example, apparatus 110 in mobile device 104-1 may be used to possibly generate and provide a shared data file to mobile device 104-2 e.g. over one or more wireless signals 132. Here, for example, apparatus 110 in mobile device 104-2 may be used to possibly request and/or otherwise obtain such a shared data file from mobile device 104-1. Thus, in certain instances mobile device 104-1 may serve as a peer device in providing one or more shared data files relating to location based service content for indoor environment 140 to mobile device 104-2.

Similarly, in certain instances, apparatus 110 in mobile device 104-2 may similarly communicate with apparatus 112 in a computing device 102, e.g. via wireless signal(s) 130 and/or 122. As such, apparatus 110 and mobile device 104-2 may, for example, obtain one or more seeded data files relating to location based service content for indoor environment 140, and selectively generate and provide one or more shared data files to one or more other mobile devices. For example, apparatus 110 in mobile device 104-2 may provide one or more shared data files over wireless signals 132 to apparatus 110 in mobile device 104-1. Similarly, in certain instances, apparatus 110 in mobile device 104-2 may provide (or obtain) one or more shared data files over a communication link using one or more wireless signals 134 to (or from) apparatus 110 in mobile device 104-n. Although communication links are not illustrated between all of the mobile devices in FIG. 1, it should be understood that under certain circumstances two or more mobile devices may act as peers to one another in a peer to peer exchange (unidirectional or bidirectional) of information relating to the techniques provided herein.

Other resources (devices) 135 may represent one or more computing platforms from which computing device 102 may obtain all or part of an initial location based service content relating to an indoor environment 140. Thus, for example, other resources (devices) 135 may generate all or part of an initial location based service content. In certain instances, other resources (devices) 135 may support computing device 102 in other ways which may relate to the location based service content distribution techniques provided herein. For example, in certain instances other resources (devices) 135 may generate, identify, affect, and/or otherwise support in some manner one or more distribution schemes that may be considered in the location based service content distribution techniques provided herein.

Example environment 100 further includes a satellite positioning system (SPS) 150 which may transmit one or more SPS signals 152 to one or more mobile devices 104. SPS 150 may, for example, represent one or more GNSS, one or more regional navigation satellite systems, and/or the like or some combination thereof. SPS signals 152 may be acquired by a mobile device 104 and used to estimate a position location of the mobile device. Although not shown, it should be understood that one or more other signal-based positioning systems may be provided to transmit various wireless signals that may be used to estimate a position location and/or related information with regard to one or more mobile devices.

Figure 2:
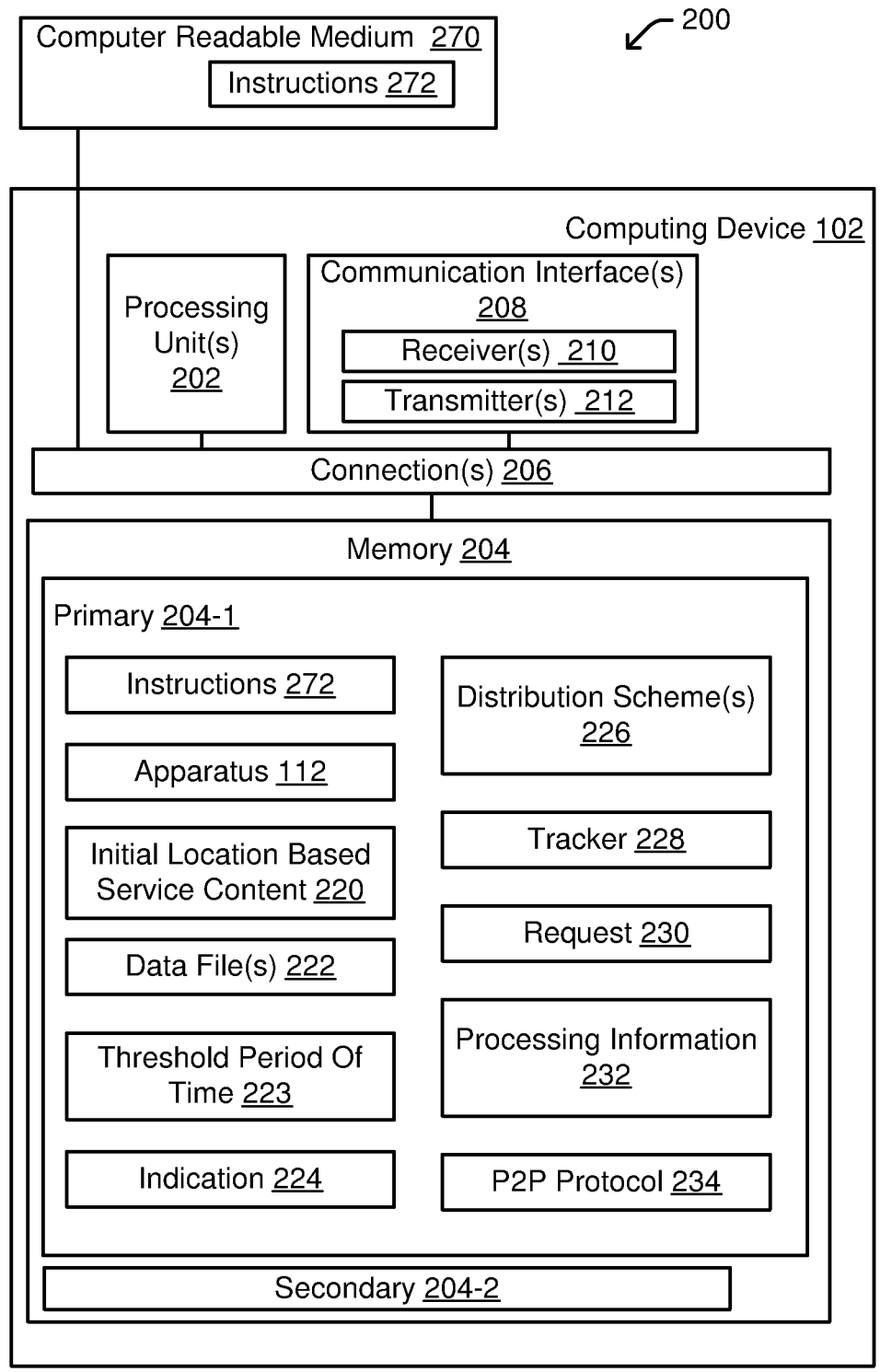
FIG. 2 is a schematic block diagram illustrating certain features of an example computing platform in a computing device for use in selectively distributing location based service content to mobile devices, in accordance with an implementation.

Attention is drawn next to FIG. 2, which is a schematic block diagram illustrating certain features of an example computing platform 200 that may be used at a computing device 102, e.g., as in FIG. 1, for selectively distributing location based service content, in accordance with an implementation.

As illustrated computing platform 200 may comprise one or more processing units 202 to perform data processing (e.g., in accordance with the techniques provided herein, as part of apparatus 112, etc.) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing platform 200. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a non-transitory computer readable medium 270. Memory 204 and/or non-transitory computer readable medium 270 may comprise instructions 272 associated with data processing, e.g., in accordance with the techniques and/or apparatus 110 (FIG. 1) and/or process 500 (FIG. 5), as provided herein.

Computing platform 200 may, for example, further comprise one or more communication interfaces 208. A communication interface(s) 208 may, for example, provide connectivity to network(s) 120, mobile device(s) 104, and/or other devices (FIG. 1), e.g., via one or more wired and/or wireless communication links. As illustrated here communication interface(s) 208 may comprise one or more receivers 210, one or more transmitters 212, and/or the like or some combination thereof. Communication interface(s) 208 may implement one or more communication protocols as may be required to support one or more wired and/or wireless communication links.

Processing unit(s) 202 and/or instructions 272 may, for example, provide or otherwise be associated with one or more signals that may be stored in memory 204 from time to time, such as: instructions 272; initial location based service content 220; one or more seeded or shared data files 222 based on an initial location based service content 220; a threshold period of time 223 (e.g., may be used to determine whether a mobile device is to receive a seeded or shared data file for a particular indoor environment); one or more indications 224; one or more distribution schemes 226; one or more trackers 228 (e.g., all or part of which may serve as one or more indications 224 in certain instances); one or more requests 230; processing information 232 and/or the like associated with one or more mobile devices; one or more indication protocols represented here by a P2P protocol 234; and/or the like or some combination thereof. In certain instances computing device 102 may further store or access or more electronic maps (not shown) and/or the like associated with one or more indoor environments.

In accordance with certain example implementations, to provide for peer-to-peer sharing capability between mobile devices, various P2P file sharing technologies may be implemented and/or adapted for use. For example, in certain instances, a bit torrent and/or other like P2P file sharing technology may be used in which a tracker and/or other like capability may be used to identify dental sources for shared data files. Here, however, rather than having a tracker and/or other like capability that is maintained/shared freely, the computing device may act as intelligent server in maintaining control over such tracker(s) 228 and/or other like capability and selectively sharing all or part of the tracker(s) and/or other information derived therefrom as one or more indications 224 to one or more mobile devices with regard to peer sharing, e.g., in accordance with the distribution techniques presented herein.

Figure 3:
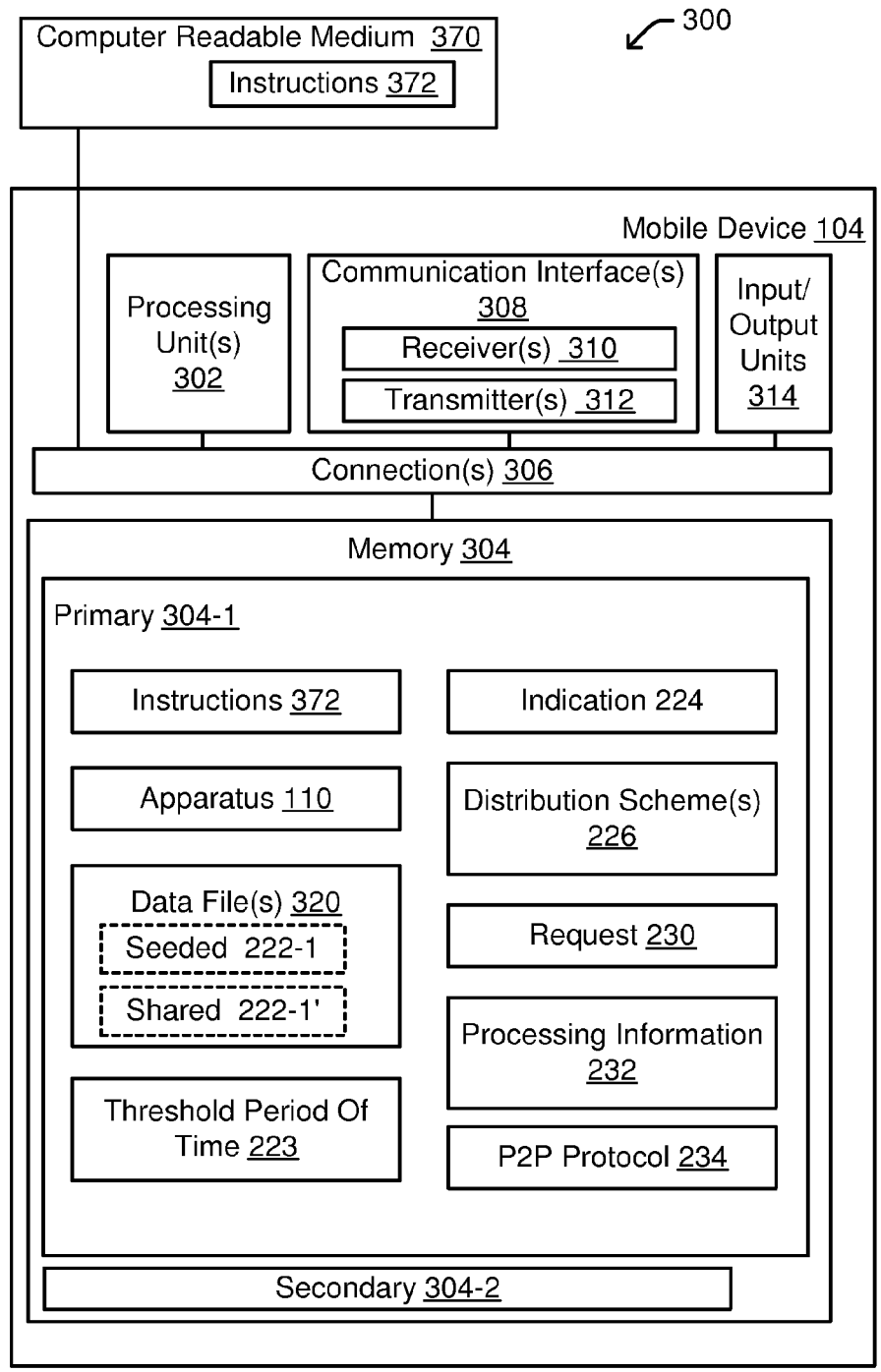
FIG. 3 is a schematic block diagram illustrating certain features of an example computing platform in a mobile device for use in selectively sharing certain location based service content with other mobile devices as a peer device, in accordance with an implementation.

Attention is drawn next to FIG. 3, which is a schematic block diagram illustrating certain features of an example computing platform 300 that may be used in a mobile device 104 to support the selective distribution of location based service content, in accordance with an implementation.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a non-transitory computer readable medium 370. Memory 304 and/or non-transitory computer readable medium 370 may comprise instructions 372 associated with data processing, e.g., in accordance with the techniques and/or apparatus 110 (FIG. 1), as provided herein.

Computing platform 300 may, for example, further comprise one or more communication interfaces 308. A communication interface(s) 308 may, for example, provide connectivity to network(s) 120, computing device 102, one or more other mobile devices 104, and/or other resources (devices) 135 (FIG. 1), e.g., via one or more wired and/or wireless communication links. As illustrated here communication interface(s) 308 may comprise one or more receivers 310, one or more transmitters 312, and/or the like or some combination thereof. Communication interface(s) 308 may implement one or more communication protocols as may be required to support one or more wired and/or wireless communication links. Communication interface(s) 308 may, in certain example instances, further comprise one or more receivers capable of receiving SPS signals 152 and/or other positioning system signals, which may be processed to estimate a location of mobile device 104.

In accordance with certain example implementations, communication interface(s) 208, communication interface(s) 308, and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices.

Mobile device 104 may, for example, further comprise one or more input/output units 314. Input/output units 314 may represent one or more devices or other like mechanisms that may be used to obtain inputs from and/or provide outputs to one or more other devices and/or a user of mobile device 104. Thus, for example, input/output units 314 may comprise various buttons, switches, a touch pad, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user. In certain instances, input/output units 314 may comprise one or more inertial sensors, one or more environmental sensors, etc., which may be useful in detecting aspects of the environment 100 and/or mobile device 104. Input/output units 314 may, for example, be used by mobile device 104 to obtain information that may be useful in requesting certain location based service content, sharing certain location based service content, using certain location based service content, etc.

Processing unit(s) 302 and/or instructions 372 may, for example, provide or otherwise be associated with one or more signals that may be stored in memory 304 from time to time, such as: instructions and/or encoded data relating to apparatus 110; one or more data files 320, e.g. one or more seeded data files 222-1, and/or one or more shared data files 222-1' for some initial location based service content; one or more threshold periods of time 223; one or more indications 224; one or more distribution schemes 226; one or more requests 230; various processing information 232, e.g., associated with mobile device 104 or one or more other mobile devices; one or more location protocols, e.g., represented here by a P2P protocol 234; and/or the like or some combination thereof.

Figure 4:
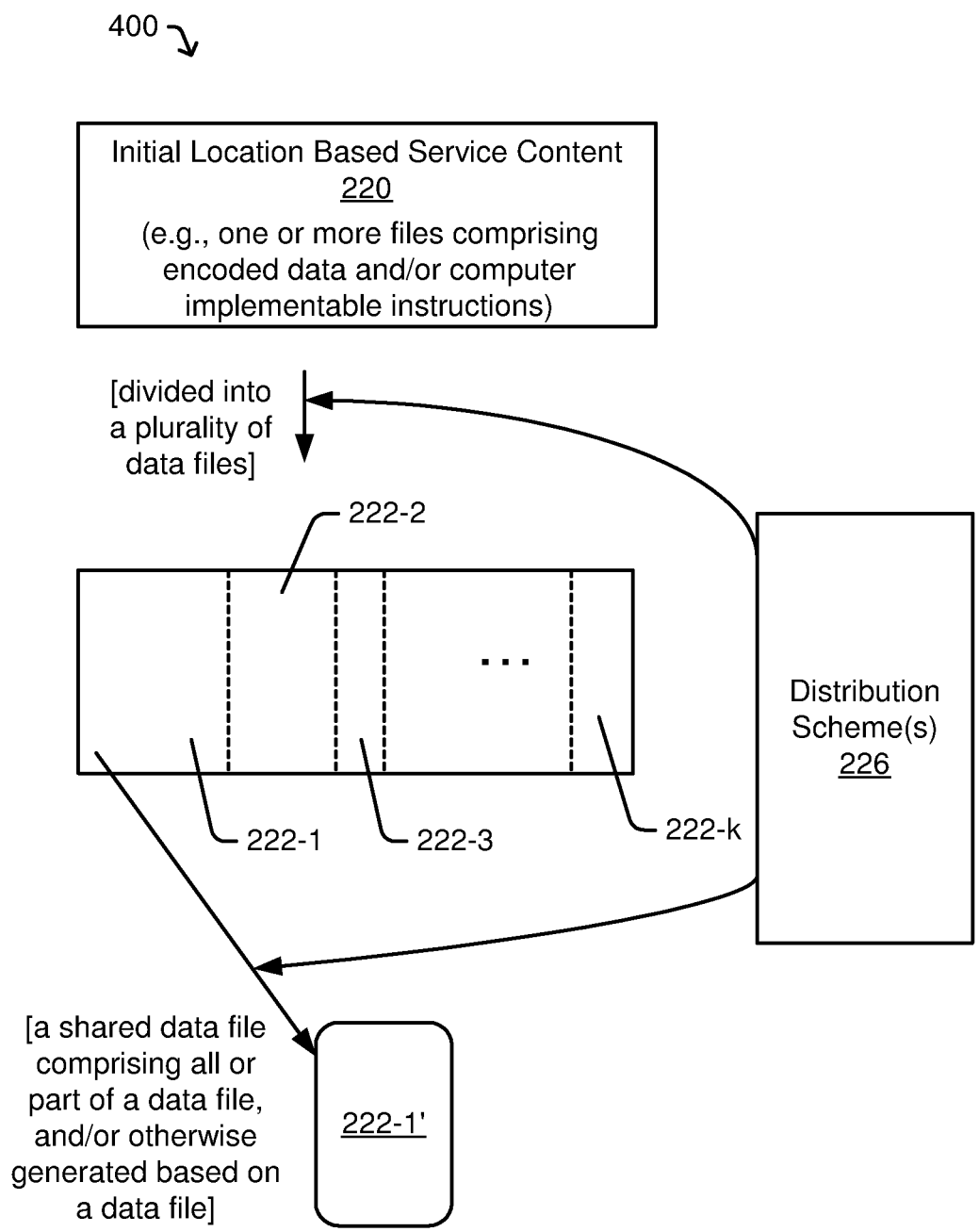
FIG. 4 is a process flow illustrating certain aspects of a process for selectively distributing location based service content to mobile devices, in accordance with an implementation.

Attention is drawn next to FIG. 4, which is a illustrative diagram showing a process flow 400 wherein initial location based service content 220, may be used to generate a plurality of seeded data files and subsequently at least one shared data file. As shown in this example initial location based service content 220 may comprise one or more files which have encoded data and/or computer implementable instructions. For example, initial location based service content 220 may comprise all or part of an encoded electronic map relating to all or part of one or more indoor environments, various forms of positioning assistance data for use with different wireless signal-based positioning technologies, informative information regarding all or part of an indoor environment and/or some venue or event associated there with, and/or the like or some combination thereof. It should be noted that selective distribution techniques provided herein for location based service content are believed useful for a variety of different types of content and therefore claimed subject matter is not intended to be limited to any particular types of location based service content.

As illustrated the initial location based service content 220 may be divided into the plurality of seeded data files, which are represented here by data files 222-1, 222-2, 222-3, . . . , 222-k. As previously mentioned, the division of initial location based service content 220 into plurality of seeded data files may be based on a variety of different factors including, for example, one or more factors associated with one or more distribution schemes 226. As a result of certain example processes, as graphically illustrated two or more of the resulting seeded data files may have different physical sizes or the same physical sizes, e.g. With regard to the amount of data contained therein. Further, in certain example implementations, as previously mentioned data files 222 may relate to distinctly different regions or areas (e.g., which may be logically and/or physically distinguishable) relating to one or more indoor environments or portions thereof.

In this example, it will be assumed that seeded data file 222-1 having been identified by a computing device has been selectively provided to at least one mobile device. The mobile device may then be called upon to selectively share data file 222-1 with one or more other (peer) mobile devices as a shared data file 222-1'. In certain instances, such a mobile device may selectively share seeded data file 222-1 without any alteration as shared data file 222-1'. In certain other instances, such a mobile device may generate shared data file 222-1' based, at least in part, on seeded data file 222-1. Thus, for example, a sharing peer mobile device may alter all or part of the location based service content in seeded data file 222-1 based on one or more distribution schemes 226, and/or processing information associated with the peer mobile device(s) which is to receive the shared data file 222-1'.

As illustrated in the example in process flow 400, one or more distribution schemes 226 may be considered when generating one or more seeded data files and/or one or more shared data files from an initial location based service content 220. Further, in certain instances, as previously mentioned one or more distribution schemes 226 and/or other processing information 232 may also be considered when identifying one or more mobile devices to act as either sharing and/or receiving peer devices.

Figure 5:
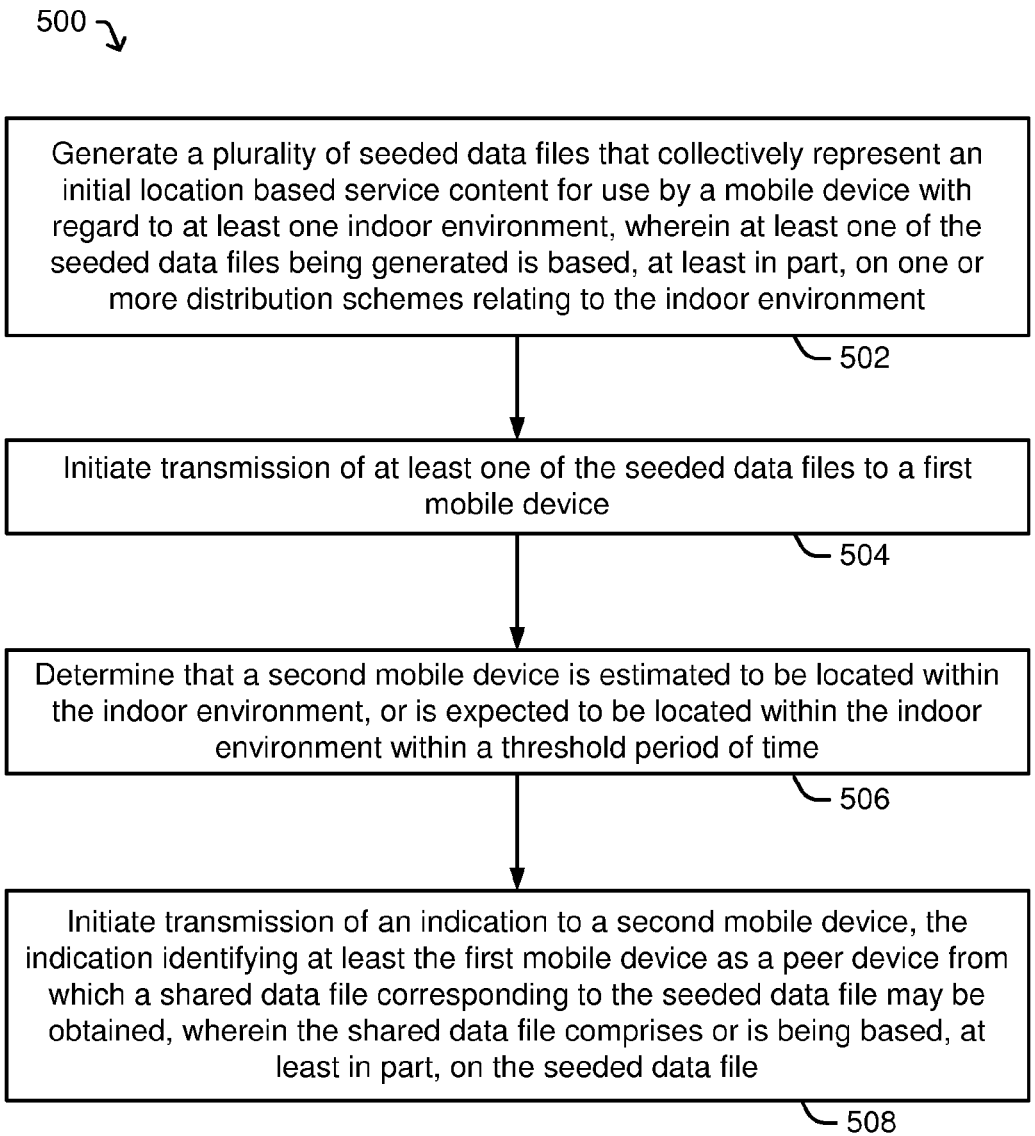
FIG. 5 is a flow diagram illustrating certain features of an example process or method for a computing device for selectively distributing location based service content to mobile devices, in accordance with an implementation.

Attention is drawn next to FIG. 5, which is a flow diagram illustrating an example method or process 500 that may be implemented at computing device 102, a computing platform 200, and/or otherwise via an apparatus 112, to support selective distribution of location based service content based on one or more distribution schemes, in accordance with certain implementations.

At example block 502, a plurality of seeded data files that collectively represent an initial location based service content for use by a mobile device with regard to at least one indoor environment may be generated. Here, for example, at least one of the seeded data files may be generated based, at least in part, on one or more distribution schemes relating to the indoor environment. For example, initial location based service content that is based, at least in part, on an electronic map may be divided and/or otherwise processed to generate one or more seeded data files using one or more of the following example distribution schemes and/or the like or some combination thereof: a tile-based distribution scheme; a data file size-based distribution scheme; a peer device constraint-based distribution scheme; a time-based distribution scheme; a user incentive reward-based distribution scheme; a user group distribution scheme; and/or a reciprocation scheme (e.g. based on one or more sharing rules, sharing history, etc.).

At example block 504, at least one of the seeded data files may be transmitted to a first mobile device. In certain example implementations, a seeded data file may be transmitted to a mobile device via one or more wireless communication links, e.g., provided by a cellular communication network, a wireless local area network, etc. In certain other example implementations, a seeded data file may be transmitted to a mobile device via one or more wired communication links. In certain example implementations, transmission of at least one of the plurality of data files may be initiated based, at least in part, a determination that the first mobile device is estimated to be currently located within the at least one indoor environment, or was recently located within the at least one indoor environment, or is expected to be located within the at least one indoor environment within a threshold period of time. A threshold period of time may vary depending upon the circumstances associated with a particular indoor environment, location based service content, users, mobile devices, certain events, certain distribution schemes, etc. Thus, for example, in certain instances, a threshold period of time may span a "short" period of time, e.g., such as, a second or less, one or more minutes, a one or more hours, etc. In other example implementations, a threshold period time may span a "long" period time, e.g., such as, one or more days, one or more weeks, one or more months, etc. In certain example implementations, a threshold period of time may indicate a single contiguous period of time or possibly to two or more noncontiguous periods of time. In certain example implementations, a threshold period of time may indicate a specific time(s) in the future, e.g. 1:15 PM GMT of a particular day, and/or some other like unique time. In certain example implementations, a threshold period of time may indicate a timed period, e.g., 500 milliseconds, 10 minutes, 3.0 hours, etc., and/or the like. In certain example implementations a threshold period of time may indicate a particular day or event that may be identifiable via a calendar and/or other like information. For example, a threshold period of time may indicate a particular day of the week, e.g. Tuesday. For example, a threshold period time indicate a particular holiday, e.g., New Year's Day. For example, a threshold period of time indicate a particular event, e.g., a scheduled sporting event, etc. It should be kept in mind that these are just some examples and claimed subject matter is not intended to be limited to these examples.

At example block 506, a determination may be made as to whether a second mobile device is estimated to be located within the indoor environment or is expected to be located within the indoor environment within the threshold period of time. Thus, for example, in certain instances a second mobile device may be estimated to be located within the indoor environment based on a reported estimated location, specific communication between certain local devices and/or other mobile devices within the indoor environment with the second mobile device, etc. In certain example implementations, a second mobile device may be expected to be located within the indoor environment within the threshold period of time based, at least in part, on movement information (e.g., estimated location, estimated trajectory, a heading, a velocity, etc.) associated with a second mobile device. In certain example implementations the second mobile device may be expected to be located within the indoor environment within the threshold period of time based, at least in part, on information relating to the user of the second mobile device, such as, e.g., scheduled travel plans, scheduled event plans, user input(s), etc. Thus, in certain example instances, one or more other data files and/or information available from one or more resources associated with the user of the second mobile device may be obtained or accessed in some manner, and processed to determine that the second mobile device may be expected to be located within the indoor environment within the threshold period of time. For example, information associated with a user's calendar, e-mail, etc. (e.g. maintained locally and/or remotely), may be accessed or otherwise considered. In a particular example, such information may reveal that the user is scheduled to fly to a particular airport, attend a particular concert, etc.

At example block 508, an indication may be transmitted to the second mobile device to at least identify at least a first mobile device as a peer device from which a shared data file corresponding to the seeded data file may be obtained. Here, for example, the shared data file may comprise or may be based, at least in part, on the seeded data file. Here, for example, an indication may represent any data that may be used to at least identify at least a first mobile device as a peer device from which a shared data file may be obtained. For example, in certain implementations, an indication may comprise an identifier for the first mobile device, and/or an identifier for a particular seeded data file and/or shared data file. In this example, having received such an indication, the second mobile device may request a corresponding shared data file from the first mobile device. In certain example implementations, an indication may comprise and/or otherwise be based, at least in part, on a tracker and/or other like data file/capability. In certain example implementations, such a tracker and/or other like data file/capability may, however, be intelligently maintained and/or otherwise generated by the one or more computing devices (e.g., server(s)) coordinating the dissemination the location based service content.

Consequently, one or more seeded data files may be transmitted or otherwise provided to one or more mobile devices that may be estimated to be located within at least one indoor environment, or may be expected to be located within the indoor environment in the future. Here, for example, in certain instances a mobile device may request one or more seeded/shared data files. In other instances, for example, a computing device may identify one or more mobile devices that may be available to help distribute at least part of the location based service content, e.g., via one or more shared data files. In certain instances, a mobile device that has been selected by a computing device may itself make use of all or part of the location based service content in the one or more seeded data files provided to it by the computing device. In other instances, mobile device that has been selected by computing device may not actually make use of any of the location based service content in a seeded data file, but may serve as a sharing peer to distribute one or more corresponding shared data files to one or more other peer mobile devices, which may themselves make use of the information and/or again pass it onto yet another peer mobile device. As previously mentioned, in certain example implementations one or more mobile devices may be selected to receive one or more seeded data files from the computing device and/or one or more shared data files from one or more other peer mobile devices based, at least in part, on one or more distribution schemes. Further, as previously mentioned, in certain example implementations one or more seeded data files may be provided to one or more mobile devices from the computing device and/ or one or more shared data files may be provided from one or more peer mobile devices to one or more other peer mobile devices based, at least in part, on one or more distribution schemes. With such example techniques, one or more distribution schemes may be provided to selectively control the distribution of location based service content, e.g., in a manner that may make efficient use of available computing and/or communication resources, provide timely delivery of useful information to one or more mobile devices, maintain distribution rights, promote certain policies, etc.

Furthermore, in certain example implementations, a computing device may consider one or more distribution schemes in selectively identifying at least a first mobile device to at least a second mobile device, e.g. in a manner to provide an indication to the second mobile device that the first mobile device has received at least a first data file (which may comprise a seeded data file and/or a corresponding shared data file). Here for example, the computing device may do so in response to a determination that the second mobile device is to receive all or part of a shared data file that may be based, at least in part, on at least a part of the first data file. In certain instances, a computing device may further initiate transmission of certain processing information to the first mobile device, e.g. the processing information may be used in generating the shared data file. In certain implementations, a computing device may determine that the second mobile device is to receive a shared data file based on a request or other information obtained from and/or learned about the second mobile device. For example, a second mobile device may request a particular seeded/shared data file, and the computing device may identify that a first mobile device may be capable of providing such shared data file to the second mobile device via a peer-to-peer communication session. For example, the computing device may obtain information that the second mobile device may be located within or may soon be located within a particular indoor environment and may either make use of a particular shared data file and/or possibly act as a sharing peer for such a location based service content to one or more other peer mobile devices. In certain implementations, a computing device may determine that the second mobile device is to receive the shared data file based on information obtained from and/or learned about the first mobile device, and/or possibly some other mobile device(s). For example, the computing device may obtain information that a first mobile device is expected to leave indoor environment soon and as such may be unable to act as a sharing peer device to other mobile devices at some future time. Hence computing device may determine that the second mobile device is to receive the shared data file so that it may serve as a sharing peer to other mobile devices instead of the first mobile device.

In another example implementation, a computing device may identify that a plurality of mobile devices have arrived within and/or will soon arrive within an indoor environment and that many of the mobile devices may make use of the location based service content available for the particular indoor environment. As such, the computing device may identify particular mobile devices to be provided certain seeded data files and which may subsequently serve as sharing peers to further the selective distribution of the location based service content via one or more shared data files. Further, as previously mentioned a computing device may determine whether a mobile device and/or a group of mobile devices is to receive one or more selected data files and/or one or more shared data files based on one or more distribution schemes.

Figure 6:
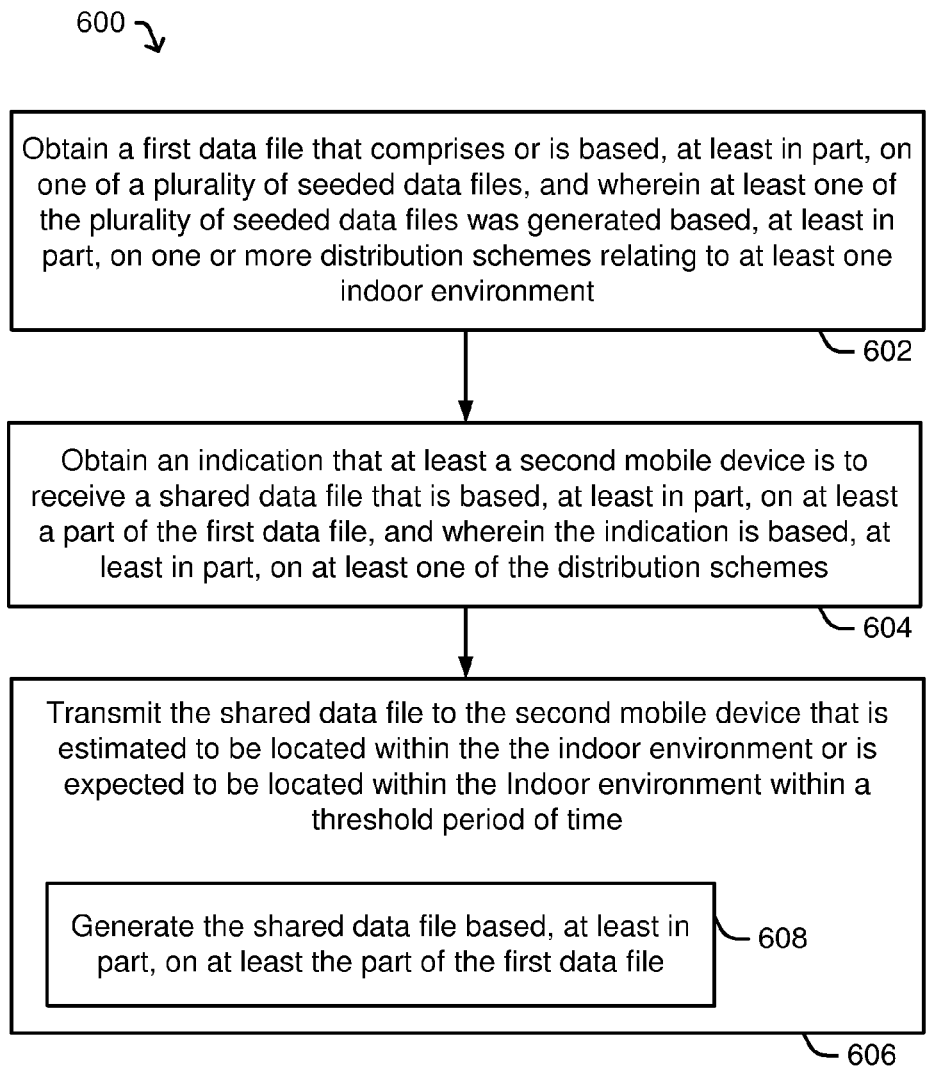
FIG. 6 is a flow diagram illustrating certain features of an example process or method for a mobile device for selectively sharing certain location based service content with other mobile devices as a peer device, in accordance with an implementation.

Attention is drawn next to FIG. 6, which is a flow diagram illustrating an example method or process 600 that may be implemented at mobile device 104, a computing platform 300, and/or otherwise via an apparatus 110, to support selective distribution of location based service content based on one or more distribution schemes in accordance with certain implementations. Process 600 may, for example, be implemented by a mobile device in serving as a sharing peer mobile device to one or more other mobile devices.

At example block 602, the mobile device may obtain at least a first data file that comprises or is based, at least in part, on at least one of a plurality of seeded data files that collectively represent an initial location based service content for use by mobile devices with regard to at least one indoor environment. Here, for example, at least one of the plurality of seeded data files may have been generated based, at least in part, on one or more distribution schemes relating to the at least one indoor environment. In certain example implementations, a mobile device may obtain a seeded data file via one or more wireless communication links provided by a cellular communication network, a wireless local area network, wireless wide area network, an access point serving as a peer device, one or more other wireless devices, etc. In certain other example implementations, a mobile device may obtain a seeded data file via one or more wired communication links.

At example block 604, the mobile device may obtain an indication that at least a second mobile device is to receive a shared data file that is based, at least in part, on at least a part of the first data file. Here, for example, be indication may be based, at least in part, on at least one of the distribution schemes. Here, for example, an indication may represent any data that may be used to at least identify at least a second mobile device as a peer device to which a shared data file may be provided by the first mobile device. For example, in certain implementations, an indication may comprise an identifier for the second mobile device, and/or an identifier for a particular seeded data file and/or shared data file to possibly be shared. Here, for example, having received such an indication, the first mobile device may respond to a request for a corresponding shared data file from the second mobile device. In another example, having received such an indication, the first mobile device may initiate communication with the second mobile device, e.g. as described at example block 606.

In certain example implementations, an indication may comprise and/or otherwise be based, at least in part, on a tracker and/or other like data file/capability. In certain example implementations, such a tracker and/or other like data file/capability may, however, be intelligently maintained and/or otherwise generated by the one or more computing devices (e.g., server(s)) coordinating the dissemination the location based service content.

At example block 606, the mobile device may initiate transmission of the shared data file to the second mobile device that is estimated to be located within the indoor environment or may be expected to be located within the indoor environment within a threshold period of time. Here, for example, in certain instances a second mobile device may be estimated to be located within the indoor environment based on a reported estimated location, specific communication between certain local devices and/or other mobile devices within the indoor environment with the second mobile device, one or more wireless signals transmitted by the second mobile device and received by the first mobile device, etc. In certain example implementations, a second mobile device may be expected to be located within the indoor environment within the threshold period of time based, at least in part, on movement information (e.g., estimated location, estimated trajectory, a heading, a velocity, etc.) associated with a second mobile device. In certain example implementations the second mobile device may be expected to be located within the indoor environment within the threshold period of time based, at least in part, on information relating to the user of the second mobile device, such as, e.g., scheduled travel plans, scheduled event plans, user input(s), etc.

Consequently, in certain instances, a mobile device may transmit a shared data file to a second mobile device upon the second mobile device being identified as having arrived at the indoor environment. Such shared data file may, for example, be transmitted to the second mobile device via a peer-to-peer wireless communication link.

In another example, the mobile device may transmit the shared data file to the second mobile device in advance of the second mobile device being identified as having arrived at the indoor environment. For example, both mobile devices may be located with users onboard a train which is expected to arrive at a train station at a future time, and as such one of the mobile devices may act as a sharing peer device to the other mobile device in providing a shared data file (e.g., for an indoor environment at or near the train station). By way of example, let us assume that initial location based service content information for an indoor environment at or near such a train station may have been divided or otherwise used to generate five seeded data files each of which may have been provided by computing device to five different mobile devices onboard a particular train heading towards the train station. Accordingly, it may be useful for the five mobile devices on board the particular train which of received data files to provide applicable corresponding shared data files to other mobile devices that may be indicated to receive such. In the end, it may be that as the train is pulling into the train station all of the applicable mobile devices (e.g., perhaps the five mobile devices and/or more, or possibly even less than five) have a been provided with the particular seeded/shared data files as originally intended. Hence, for example, users of the mobile devices may step off of the training to an indoor environment having applicable location based service content available within their mobile devices.

In a similar example, there may be a few mobile devices waiting at the train station and/or within the indoor environment located at or near the train station, which may be used to serve as a peer mobile devices for various shared data files to those mobile devices whose users are just arriving at the train station from one or more trains. Here for example, while other users are waiting for their outbound train and/or gathering their luggage, their mobile devices may be engaged in supporting the selective distribution techniques provided herein. Thus, as this example points out, a computing device may be able to send out just a few seeded data files to just a few mobile devices and indicate how such should be distributed amongst certain peer mobile devices.

In certain further example implementations, at example block 608, as previously mentioned, a mobile device may generate a particular shared data file based, at least in part, on at least a part of a particular seeded data file. Thus, for example, a shared data file may be generated (e.g., from at least one seeded data file and/or from at least one shared data file) to satisfy certain needs or preferences of a particular mobile device or group of mobile devices.

Figure 7:
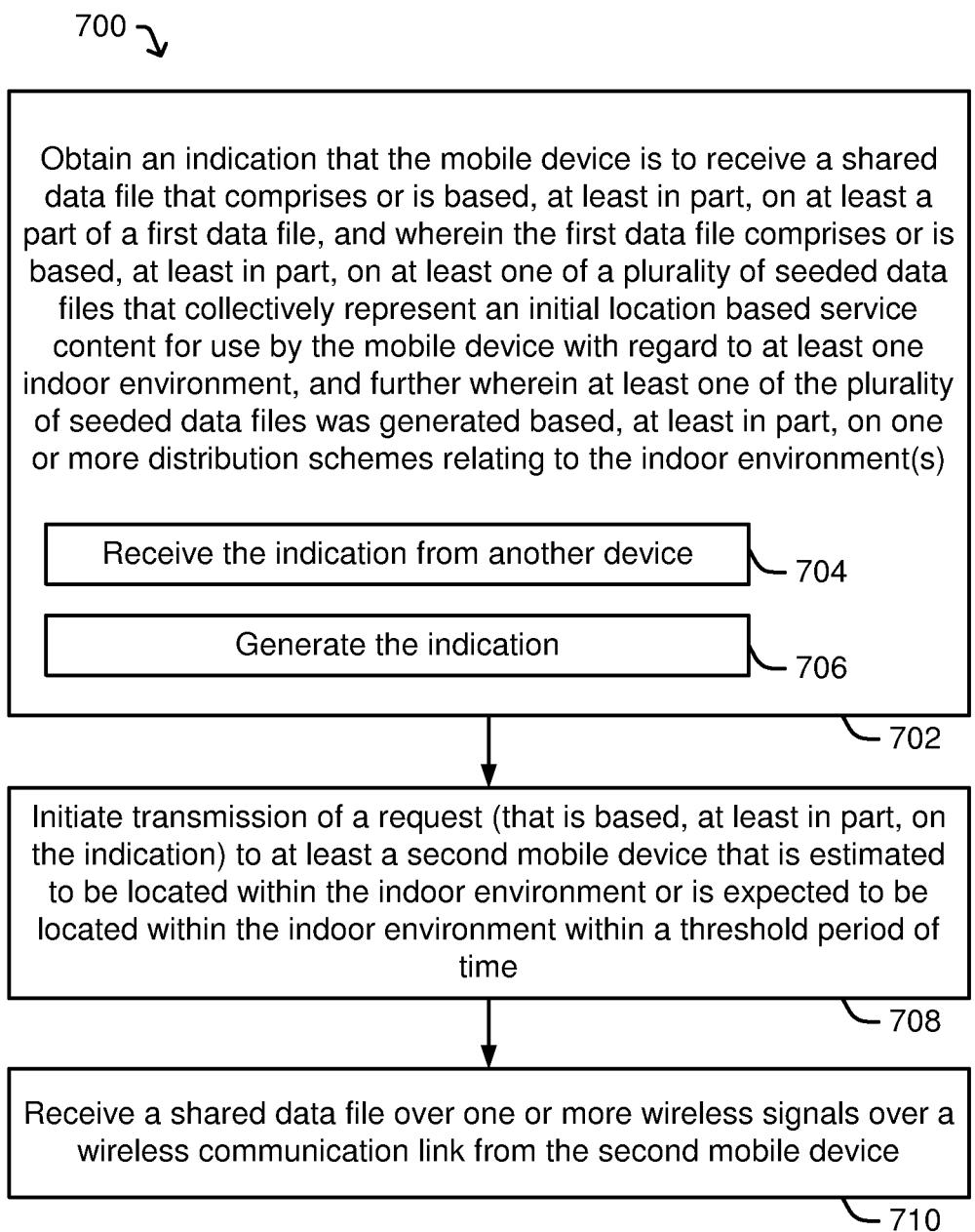
FIG. 7 is a flow diagram illustrating certain features of an example process or method for a mobile device for selectively obtaining certain shared location based service content from another mobile device as a peer device, in accordance with an implementation.

Attention is drawn next to FIG. 7, which is a flow diagram illustrating an example method or process 700 that may be implemented at mobile device 104, a computing platform 300, and/or otherwise via an apparatus 110, to support selective distribution of location based service content based on one or more distribution schemes in accordance with certain implementations. Process 700 may, for example, be implemented by a mobile device in serving as a receiving peer device with regard to one or more other sharing peer mobile devices.

At example block 702, a mobile device may obtain an indication that it may receive a shared data file, e.g., from a second mobile device acting as a sharing peer device. Here, for example, the shared data file may comprise or may be based, at least in part, on at least a part of a first data file. Further, for example, the first data file may comprise or may be based, at least in part, on at least one of a plurality of seeded data files that collectively represent an initial location based service content for use by the mobile device with regard to at least one indoor environment. Here, for example, at least one of the plurality of seeded data files may have been generated based, at least in part, on one or more distribution schemes relating to the indoor environment. For example, in certain instances at block 704 the mobile device may receive an indication from another device, e.g., such as a computing device, and/or another mobile device. In certain other instances, for example at block 706, the mobile device itself may generate such an indication.

At example block 708, the mobile device may initiate transmission of a request to the second mobile device. Here, for example, the request may be based, at least in part, on the indication, and transmitted to the second mobile device which may be estimated to be located within the indoor environment or may be expected to be located within the indoor environment within a threshold period of time. At example block 710, the mobile device may receive the shared data file over a wireless communication link from the second mobile device.

In accordance with certain example implementations, a selected distribution of location based service content as presented in the examples above may take the form of a hybrid P2P technology solution in which the distribution remains selective and/or otherwise controlled in some manner, e.g., based on one or more distribution schemes. Here, for example, as previously mentioned one or more distribution schemes may be used to limit distribution to particular mobile devices based on various factors and/or rules. For example, the location of mobile devices may be considered, the user of a mobile device may be considered, the mobile devices interactions may be considered, etc. Furthermore, the location based service content itself may be specifically divided into manageable and/or other like suitable seeded data files based, at least in part, on one or more of the distribution schemes. Further still, in certain implementations, mobile devices acting as sharing peer mobile devices may further affect the location based service content that is being distributed as shared data files in some manner for a receiving peer mobile device based, at least in part on one or more of the distribution schemes. Accordingly, rather than simply making use of existing P2P technology to distribute portions of data content as might a bit-torrent or other data sharing system, the techniques provided herein may focus on providing carefully controlled distribution of location based service content to mobile devices that are located within or are expected to be located within a particular indoor environment in a future time. Such techniques may work well with mobile devices having limited computing and/or storage resources, and/or limited communication capabilities. Such techniques may work well for computing devices having limited computing and/or storage resources and/or limited communication capabilities, and wherein the computing devices may have to provide location based service content to a plethora of mobile devices at peak times and/or otherwise be expected to distribute such information in an otherwise timely manner. Additionally, certain distribution schemes may be provided to enforce and/or otherwise encourage certain peer-to-peer sharing by mobile devices with regard to a particular indoor location.

In certain example implementations, computing device may obtain an estimated location and/or tracking for the mobile devices which may enable certain decisions to be made with regard to the distribution of location based service content. In certain instances, various pinging techniques may be implemented to identify mobile devices within a particular area and/or to make ranging estimates, etc. Additionally, in certain instances, one or more mobile devices may further identify one or more other mobile devices that may be nearby based on signaling techniques, etc. In certain example implementations, mobile devices may establish peer-to-peer communication links via various communication interfaces. For example, certain instances device for use Wi-Fi based communication links, Bluetooth based communication links, infrared based communication links, and/or the like or some combination thereof. In certain instances, a computing device may be implemented with similar applicable communication interfaces it too may be capable of communicating with one or more mobile devices using peer-to-peer communication protocols, etc.

In certain example implementations, one or more distribution schemes may be provided to distribute location based service content between mobile devices based on some efficiency/load-balancing and/or other like cost functions. Additionally, in certain instances, it may be beneficial to monitor the distribution process and establish and/or otherwise affect certain distribution schemes to provide further improved services, e.g. based on historical trends, etc.

In accordance with certain example implementations, a mobile device may identify (e.g., discover) one or more other mobile devices that may be within an indoor environment or some portion thereof, and possibly within a particular range, without necessarily interacting with one or more computing devices (e.g. server(s)) associated with the indoor environment. For example, in certain instances a mobile device may use a P2P wireless link, such as may be provided via LTE-direct or WiFi-direct, or through AP or some other high-level service like Google Latitude, and/or the like or some combination thereof. In certain instances, an indication may be provided which may identify mobile devices that are currently downloading or have downloaded certain data files. For example, in certain instances an indication may comprise a tracker and/or other like data file(s) that may identify mobile devices that may be involved in sharing all or part of the location based service content associated with an indoor environment or portion thereof. As previously mentioned, such an indication may, for example, be managed/maintained and/or otherwise provided by one or more computing devices associated with all or part of the indoor environment. Thus, for example, a server or other like device/resource may be provided to specifically build and maintain one or more indications that may be used to control the sharing of location based service content associated with an indoor environment or portion thereof. Thus, in certain example implementations, one or more computing devices (e.g. server(s)) may provide commands and/or suggestions via one or more indications to one or more mobile devices to initiate or otherwise control the exchange/sharing of location based service content in the form of peer to peer transmitted data files. For example, mobile device may enter a shopping mall and obtain a particular (seeded) data file from a server, e.g. via a 3G, 4G, or other wireless communication link. One or more indications may be provided to the mobile device to command or suggest that the mobile device provide a shared data file to one or more other mobile devices that may be estimated to be currently located in the shopping mall or possibly expected to arrive in a shopping mall within some threshold time. The one or more indications may, for example, include additional information about the one or more other devices and/or the respective shared data files to be provided to the one or more other devices. For example, an indication may indicate that a mobile device having a seeded data file may provide a corresponding shared data to another mobile device in response to a determination that one or both of the mobile devices are estimated to be located within a particular portion of an indoor environment, within a threshold distance of one another, moving towards or away from one another, of similar or non-similar types of devices, having appropriate authorization to obtain/share such location based service content. Indeed, as mentioned, an indication may relate to one or more distribution schemes, and/or some aspect thereof. Hence, the techniques provided herein make it possible to provide for an "intelligent" and/or otherwise controlled dissemination of location based service content that a traditional bit torrent and/or other like P2P data file capability may not provide.

In certain example implementations, apparatus 112 (FIG. 1) may track or otherwise maintain a listing of mobile devices which may have received seeded data files and/or shared data files, and which are no longer estimated to be within and/or headed towards an indoor environment, but which may still be capable of providing a corresponding shared data file to one or more other mobile devices. Thus, for example, a mobile device that may have received a seeded or shared data file while within an airport terminal and which may be currently headed away from the airport (e.g., with a user riding in a bus or automobile) may still be capable of providing a corresponding shared data file to another mobile device, e.g. which may be headed towards the airport (e.g., with another user riding in a train, airplane, automobile, etc.).

In certain example implementations, various techniques may be provided to authenticate and/or otherwise encrypt/decrypt one or more seeded and/or shared data files, or portions thereof. Hence, for example, a seeded or shared data file may be specifically encrypted prior to sharing it with one or more mobile devices. Hence, for example, one or more indications and/or other like information may be provided to support such encryption/decryption and/or other authentication techniques. Indeed, in certain example implementations, various techniques may be provided to authenticate and/or otherwise encrypt/decrypt an indication provided to a mobile device. Such techniques are well known and beyond the scope of this description.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with at least one computing device:
   generating a plurality of data files that collectively represent an initial location based service content for use by a mobile device with regard to at least one indoor environment, wherein at least one of said plurality of data files is generated based, at least in part, on one or more distribution schemes relating to said at least one indoor environment;
   initiating transmission of at least one of said plurality of data files, as a seeded data file, to a first mobile device;
   determining that a second mobile device is estimated to be currently located within said at least one indoor environment, or is expected to be located within said at least one indoor environment within a threshold period of time; and
   initiating transmission of an indication to said second mobile device, said indication identifying at least said first mobile device as a peer device from which a shared data file corresponding to said seeded data file is available, said shared data file comprising or being based, at least in part, on said seeded data file, and
   wherein at least one of said first mobile device or said second mobile device are identified based, at least in part, on at least one of said one or more distribution schemes.

2. The method as recited in claim 1, wherein said initiating transmission of said at least one of said plurality of data files is based, at least in part, on a determination that said first mobile device is estimated to be currently located within said at least one indoor environment.

3. The method as recited in claim 1, wherein said initiating transmission of said at least one of said plurality of data files is based, at least in part, on a determination that said first mobile device was recently located within said at least one indoor environment.

4. The method as recited in claim 1 wherein said initiating transmission of said at least one of said plurality of data files is based, at least in part, on a determination that said first mobile device is expected to be located within said at least one indoor environment within said threshold period of time.

5. The method as recited in claim 1, wherein said initiating transmission of said at least one of said plurality of data files is based, at least in part, on at least one of said one or more distribution schemes.

6. The method as recited in claim 1, wherein said one or more distribution schemes comprises at least one tracking scheme that is based, at least in part, on an estimated location of at least one of: said at least said first mobile device, and/or said at least said second mobile device.

7. The method as recited in claim 1, wherein said one or more distribution schemes comprises a tile-based distribution scheme that is based, at least in part, on an electronic map of said at least one indoor environment.

8. The method as recited in claim 1, wherein said one or more distribution schemes comprises a data file size-based distribution scheme that is based, at least in part, on a wireless communication protocol.

9. The method as recited in claim 1, wherein said one or more distribution schemes comprises a peer device constraint-based distribution scheme that is based, at least in part, on one or more operating constraints associated with one or more specific mobile devices.

10. The method as recited in claim 1, wherein said one or more distribution schemes comprises a time-based distribution scheme that is based, at least in part, on at least one anticipated event.

11. The method as recited in claim 1, wherein said one or more distribution schemes comprises a user incentive reward-based distribution scheme that is based, at least in part, on at least one user rewards system.

12. The method as recited in claim 1, wherein said one or more distribution schemes comprises a user group distribution scheme that is based, at least in part, on at least one user attribute.

13. The method as recited in claim 1, wherein said one or more distribution schemes comprises a reciprocation scheme that is based, at least in part, on at least one of: one or more peer device sharing rules, and/or a peer device sharing history.

14. The method as recited in claim 1, wherein said at least said first mobile device is selectively identified to said second mobile device based, at least in part, in response to a request from said second mobile device.

15. The method as recited in claim 1, wherein said seeded data file is transmitted over a wireless communication link to said first mobile device using a peer-to-peer networking protocol.

16. The method as recited in claim 1, wherein said first mobile device and said second mobile device are capable of communicating over a wireless communication link using a peer-to-peer networking protocol.

17. The method as recited in claim 1, and further comprising:
   affecting at least a part of said seeded data file to provide for authentication of said seeded data file.

18. An apparatus for use in at least one computing device, the apparatus comprising:
   means for generating a plurality of data files that collectively represent an initial location based service content for use by a mobile device with regard to at least one indoor environment, wherein at least one of said plurality of data files is generated based, at least in part, on one or more distribution schemes relating to said at least one indoor environment;
   means for transmitting at least one of said plurality of data files, as a seeded data file, to a first mobile device;
   means for determining that a second mobile device is estimated to be located within said at least one indoor environment or is expected to be located within said at least one indoor environment within a threshold period of time;
   means for transmitting an indication to said second mobile device, said indication identifying at least said first mobile device as a peer device from which a shared data file corresponding to said seeded data file is available, said shared data file comprising or being based, at least in part, on said seeded data file; and
   means for identifying at least one of said first mobile device or said second mobile device based, at least in part, on at least one of said one or more distribution schemes.

19. The apparatus as recited in claim 18, wherein transmission of said at least one of said plurality of data files is based, at least in part, on a determination that said first mobile device: is estimated to be currently located within said at least one indoor environment; or was recently located within said at least one indoor environment; or is expected to be located within said at least one indoor environment within said threshold period of time.

20. The apparatus as recited in claim 18, wherein at least one of said means for transmitting said at least one of said plurality of data files, or said means for transmitting said indication, is responsive in a transmission timing based, at least in part, on at least one of said one or more distribution schemes.

21. The apparatus as recited in claim 18, wherein said one or more distribution schemes comprises at least one tracking scheme that is based, at least in part, on an estimated location of at least one of: said first mobile device, and/or said second mobile device.

22. The apparatus as recited in claim 18, wherein said one or more distribution schemes comprises at least one of:
   a tile-based distribution scheme that is based, at least in part, on an electronic map of said at least one indoor environment;
   a data file size-based distribution scheme that is based, at least in part, on a wireless communication protocol;
   a peer device constraint-based distribution scheme that is based, at least in part, on one or more operating constraints associated with one or more specific mobile devices; and/or
   a time-based distribution scheme that is based, at least in part, on at least one anticipated event.

23. The apparatus as recited in claim 18, wherein said one or more distribution schemes comprises at least one of:
   a user incentive reward-based distribution scheme that is based, at least in part, on at least one user rewards system;
   a user group distribution scheme that is based, at least in part, on at least one user attribute; and/or
   a reciprocation scheme that is based, at least in part, on at least one of: one or more peer device sharing rules, and/or a peer device sharing history.

24. The apparatus as recited in claim 18, and further comprising means for receiving a request from said second mobile device, and wherein said at least said first mobile device is selectively identified to said second mobile device based, at least in part, in response to said request.

25. The apparatus as recited in claim 18, wherein said first mobile device and said second mobile device are capable of communicating over a wireless communication link using a peer-to-peer networking protocol.

26. A device comprising:
   a communication interface; and
   one or more processing units to:
      generate a plurality of data files that collectively represent an initial location based service content for use by a mobile device with regard to at least one indoor environment, wherein at least one of said plurality of data files is generated based, at least in part, on one or more distribution schemes relating to said at least one indoor environment;
      initiate transmission, via said communication interface, of at least one of said plurality of data files, as a seeded data file, to a first mobile device;
      determine that a second mobile device is estimated to be located within said at least one indoor environment or is expected to be located within said at least one indoor environment within a threshold period of time; and
      initiate transmission, via said communication interface, of an indication to said second mobile device, said indication identifying at least said first mobile device as a peer device from which a shared data file corresponding to said seeded data file is available, said shared data file comprising or being based, at least in part, on said seeded data file, and
   wherein at least one of said first mobile device or said second mobile device are identified by said one or more processing units based, at least in part, on at least one of said one or more distribution schemes.

27. The apparatus as recited in claim 26, wherein said one or more processing units to initiate said transmission of said at least one of said plurality of data files based, at least in part, on a determination that said first mobile device: is estimated to be currently located within said at least one indoor environment; or was recently located within said at least one indoor environment; or is expected to be located within said at least one indoor environment within said threshold period of time.

28. The device as recited in claim 26, said one or more processing units to further: selectively initiate at least one transmission via said communication interface based, at least in part, on at least one of said one or more distribution schemes.

29. The device as recited in claim 26, wherein said one or more distribution schemes comprises at least one tracking scheme that is based, at least in part, on an estimated location of at least one of: said first mobile device, and/or said second mobile device.

30. The device as recited in claim 26, wherein said one or more distribution schemes comprises at least one of:
   a tile-based distribution scheme that is based, at least in part, on an electronic map of said at least one indoor environment;
   a data file size-based distribution scheme that is based, at least in part, on a wireless communication protocol;
   a peer device constraint-based distribution scheme that is based, at least in part, on one or more operating constraints associated with one or more specific mobile devices; and/or
   a time-based distribution scheme that is based, at least in part, on at least one anticipated event.

31. The device as recited in claim 26, wherein said one or more distribution schemes comprises at least one of:
   a user incentive reward-based distribution scheme that is based, at least in part, on at least one user rewards system;
   a user group distribution scheme that is based, at least in part, on at least one user attribute; and/or
   a reciprocation scheme that is based, at least in part, on at least one of: one or more peer device sharing rules, and/or a peer device sharing history.

32. The device as recited in claim 26, said one or more processing units to further:
   receive a request for said shared data file, via said communication interface, from said second mobile device, and selectively identify said first mobile device to said second mobile device in response to said request.

33. The device as recited in claim 26, wherein said communication interface transmits said seeded data file over a wireless communication link to said first mobile device using a peer-to-peer networking protocol.

34. A non-transitory computer readable medium having stored therein computer implementable instructions executable by one or more processing units in at least one computing device to:
   generate a plurality of data files that collectively represent an initial location based service content for use by a mobile device with regard to at least one indoor environment, wherein at least one of said plurality of data files is generated based, at least in part, on one or more distribution schemes relating to said at least one indoor environment;

initiate transmission of at least one of said plurality of data files, as a seeded data file, to a first mobile device;

determine that a second mobile device is estimated to be located within said at least one indoor environment or is expected to be located within said at least one indoor environment within a threshold period of time; and initiate transmission of an indication to said second mobile device, said indication identifying at least said first mobile device as a peer device from which a shared data file corresponding to said seeded data file is available, said shared data file comprising or being based, at least in part, on said seeded data file, and wherein at least one of said first mobile device or said second mobile device are identified based, at least in part, on at least one of said one or more distribution schemes.

35. The article as recited in claim 34, wherein said transmission of said at least one of said plurality of data files is initiated based, at least in part, a determination that said first mobile device: is estimated to be currently located within said at least one indoor environment; or was recently located within said at least one indoor environment; or is expected to be located within said at least one indoor environment within said threshold period of time.

36. The article as recited in claim 34, wherein said transmission of said at least one of said plurality of data files is based, at least in part, on at least one of said one or more distribution schemes.

37. The article as recited in claim 34, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

38. The article as recited in claim 34, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

39. The article as recited in claim 34, wherein said first mobile device and said second mobile device are capable of communicating over a wireless communication link using a peer-to-peer networking protocol.

40. A method comprising, with a mobile device:
obtaining at least a first data file that comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;

obtaining an indication that at least a second mobile device is to receive a shared data file that is based, at least in part, on at least a part of said first data file, said indication being based, at least in part, on said one or more distribution schemes relating to said at least one indoor environment; and initiating transmission of said shared data file to said second mobile device that is estimated to be located within the said at least one indoor environment or is expected to be located within said at least one indoor environment within a threshold period of time.

41. The method as recited in claim 40, wherein said one or more distribution schemes comprises at least one tracking scheme that is based, at least in part, on an estimated location of at least one of: said mobile device, and/or said second mobile device.

42. The method as recited in claim 40, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

43. The method as recited in claim 40, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

44. The method as recited in claim 40, wherein said at least said first data file is received over a wireless communication link from at least one of: a computing device; and/or one or more other mobile devices.

45. The method as recited in claim 40, wherein said at least said first data file is received over a wireless communication link using a peer to peer networking protocol.

46. The method as recited in claim 40, wherein said indication is received from at least one of: a computing device; said second mobile device; and/or one or more other mobile devices.

47. The method as recited in claim 40, wherein said shared data file comprises said first data file.

48. The method as recited in claim 40, and further comprising, with said mobile device: generating said shared data file based, at least in part, on said at least said part of said first data file.

49. The method as recited in claim 40, and further comprising, with said mobile device: generating said shared data file based, at least in part, on at least one of said one or more distribution schemes.

50. The method as recited in claim 40, and further comprising, with said mobile device:
obtaining processing information from at least one other device; and generating said shared data file based, at least in part, on said processing information.

51. An apparatus for use in a mobile device, the apparatus comprising:
   means for obtaining at least a first data file that comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;
   means for obtaining an indication that at least a second mobile device is to receive a shared data file that is based, at least in part, on at least a part of said first data file, said indication being based, at least in part, on said one or more distribution schemes relating to said at least one indoor environment; and
   means for initiating transmission of said shared data file to said second mobile device that is estimated to be located within the said at least one indoor environment or is expected to be located within said at least one indoor environment within a threshold period of time.

52. The apparatus as recited in claim 51, wherein said one or more distribution schemes comprises at least one tracking scheme that is based, at least in part, on an estimated location of at least one of: said mobile device, and/or said second mobile device.

53. The apparatus as recited in claim 51, wherein said one or more distribution schemes comprises at least one of:
   a tile-based distribution scheme that is based, at least in part, on an electronic map of said at least one indoor environment;
   a data file size-based distribution scheme that is based, at least in part, on a wireless communication protocol;
   a peer device constraint-based distribution scheme that is based, at least in part, on one or more operating constraints associated with one or more specific mobile devices; and/or
   a time-based distribution scheme that is based, at least in part, on at least one anticipated event.

54. The apparatus as recited in claim 51, wherein said one or more distribution schemes comprises at least one of:
   a user incentive reward-based distribution scheme that is based, at least in part, on at least one user rewards system;
   a user group distribution scheme that is based, at least in part, on at least one user attribute; and/or
   a reciprocation scheme that is based, at least in part, on at least one of: one or more peer device sharing rules, and/or a peer device sharing history.

55. The apparatus as recited in claim 51, wherein said shared data file comprises said first data file.

56. The apparatus as recited in claim 51, and further comprising: means for generating said shared data file based, at least in part, on said at least said part of said first data file.

57. A mobile device comprising:
   a communication interface; and
   one or more processing units to:
      obtain, via said communication interface, at least a first data file that comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;
      obtain, via said communication interface, an indication that at least a second mobile device is to receive a shared data file that is based, at least in part, on at least a part of said first data file, said indication being based, at least in part, on said one or more distribution schemes relating to said at least one indoor environment; and
      initiate transmission of said shared data file, via said communication interface, to said second mobile device that is estimated to be located within the said at least one indoor environment or is expected to be located within said at least one indoor environment within a threshold period of time.

58. The mobile device as recited in claim 57, wherein said one or more distribution schemes comprises at least one tracking scheme that is based, at least in part, on an estimated location of at least one of: said mobile device, and/or said second mobile device.

59. The mobile device as recited in claim 57, wherein said one or more distribution schemes comprises at least one of:
   a tile-based distribution scheme that is based, at least in part, on an electronic map of said at least one indoor environment;
   a data file size-based distribution scheme that is based, at least in part, on a wireless communication protocol;
   a peer device constraint-based distribution scheme that is based, at least in part, on one or more operating constraints associated with one or more specific mobile devices; and/or
   a time-based distribution scheme that is based, at least in part, on at least one anticipated event.

60. The mobile device as recited in claim 57, wherein said one or more distribution schemes comprises at least one of:
   a user incentive reward-based distribution scheme that is based, at least in part, on at least one user rewards system;
   a user group distribution scheme that is based, at least in part, on at least one user attribute; and/or
   a reciprocation scheme that is based, at least in part, on at least one of: one or more peer device sharing rules, and/or a peer device sharing history.

61. The mobile device as recited in claim 57, wherein said indication is received via said communication interface from at least one of: a computing device; said second mobile device; and/or one or more other mobile devices.

62. The mobile device as recited in claim 57, wherein said shared data file comprises said first data file.

63. The mobile device as recited in claim 57, said one or more processing units to further: generate said shared data file based, at least in part, on said at least said part of said first data file.

64. The mobile device as recited in claim 57, said one or more processing units to further:
   obtain processing information from at least one other device via said communication interface, said processing information being based, at least in part, on said at least one of said one or more distribution schemes; and
   generate said shared data file based, at least in part, on said processing information.

65. A non-transitory computer readable medium having stored therein computer implementable instructions executable by one or more processing units in a mobile device to:
   obtain at least a first data file that comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;

obtain an indication that at least a second mobile device is to receive a shared data file that is based, at least in part, on at least a part of said first data file, said indication being based, at least in part, on said one or more distribution schemes relating to said at least one indoor environment; and initiate transmission of said shared data file to said second mobile device that is estimated to be located within the said at least one indoor environment or is expected to be located within said at least one indoor environment within a threshold period of time.

66. The article as recited in claim 65, wherein said one or more distribution schemes comprises at least one tracking scheme that is based, at least in part, on an estimated location of at least one of: said mobile device, and/or said second mobile device.

67. The article as recited in claim 65, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

68. The article as recited in claim 65, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

69. The article as recited in claim 65, wherein said shared data file comprises said first data file.

70. The article as recited in claim 55, said computer implementable instructions being further executable by said one or more processing units to: generate said shared data file based, at least in part, on said at least said part of said first data file.

71. A method comprising, with a mobile device:
obtaining an indication that said mobile device is to receive a shared data file that comprises or is based, at least in part, on at least a part of a first data file, wherein said first data file comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;
initiating transmission of a request that is based, at least in part, on said indication to at least a second mobile device that is estimated to be located within said at least one indoor environment or is expected to be located within said at least one indoor environment within a threshold period of time; and
receiving said shared data file over a wireless communication link from said second mobile device.

72. The method as recited in claim 71, wherein said one or more distribution schemes comprises at least one tracking scheme that is based, at least in part, on an estimated location of at least one of: said mobile device, and/or said second mobile device.

73. The method as recited in claim 71, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

74. The method as recited in claim 71, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

75. The method as recited in claim 71, wherein said indication is received from at least one of: a computing device; and/or said at least said second mobile device.

76. The method as recited in claim 71, wherein said request further comprises processing information, and wherein said shared data file is generated based, at least in part, on said processing information.

77. The method as recited in claim 71, wherein said shared data file is received over said wireless communication link using a peer to peer networking protocol.

78. The method as recited in claim 71, wherein said shared data file comprises said first data file.

79. An apparatus for use in a mobile device, the apparatus comprising:
means for obtaining an indication that said mobile device is to receive a shared data file that comprises or is based, at least in part, on at least a part of a first data file, wherein said first data file comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;
means for transmitting a request that is based, at least in part, on said indication to at least a second mobile device that is estimated to be located within said at least one indoor environment or is expected to be located within said at least one indoor environment within a threshold period of time; and
means for receiving said shared data file over a wireless communication link from said second mobile device.

80. The apparatus as recited in claim 79, wherein said one or more distribution schemes comprises at least one tracking scheme that is based, at least in part, on an estimated location of at least one of: said mobile device, and/or said second mobile device.

81. The apparatus as recited in claim 79, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

82. The apparatus as recited in claim 79, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

83. A mobile device comprising:
a communication interface; and
one or more processing units to:
obtain, via said communication interface, an indication that said mobile device is to receive a shared data file that comprises or is based, at least in part, on at least a part of a first data file, wherein said first data file comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;
initiate transmission, via said communication interface, of a request that is based, at least in part, on said indication to at least a second mobile device that is estimated to be located within said at least one indoor environment or is expected to be located within said at least one indoor environment within a threshold period of time; and
receive, via said communication interface, said shared data file over a wireless communication link from said second mobile device.

84. The mobile device as recited in claim 83, wherein said one or more distribution schemes comprises at least one tracking scheme that is based, at least in part, on an estimated location of at least one of: said mobile device, and/or said second mobile device.

85. The apparatus as recited in claim 83, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

86. The apparatus as recited in claim 83, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

87. A non-transitory computer readable medium having stored therein computer implementable instructions executable by one or more processing units of a mobile device to:
obtain an indication that said mobile device is to receive a shared data file that comprises or is based, at least in part, on at least a part of a first data file, wherein said first data file comprises or is based, at least in part, on at least one of a plurality of seeded data files that collectively represent an initial location based service content for use by said mobile device with regard to at least one indoor environment, wherein at least one of said plurality of seeded data files was generated based, at least in part, on one or more distribution schemes relating to said at least one indoor environment;
initiate transmission of a request that is based, at least in part, on said indication to at least a second mobile device that is estimated to be located within said at least one indoor environment or is expected to be located within said at least one indoor environment within a threshold period of time; and
receive said shared data file over a wireless communication link from said second mobile device.

88. The article as recited in claim 87, wherein said one or more distribution schemes comprises at least one tracking scheme that is based, at least in part, on an estimated location of at least one of: said mobile device, and/or said second mobile device.

89. The article as recited in claim 87, wherein said one or more distribution schemes comprises at least one of:
a tile-based distribution scheme that is based, at least in part, on an electronic map of said at least one indoor environment;
a data file size-based distribution scheme that is based, at least in part, on a wireless communication protocol;
a peer device constraint-based distribution scheme that is based, at least in part, on one or more operating constraints associated with one or more specific mobile devices; and/or
a time-based distribution scheme that is based, at least in part, on at least one anticipated event.

90. The article as recited in claim 87, wherein said one or more distribution schemes comprises at least one of:
a user incentive reward-based distribution scheme that is based, at least in part, on at least one user rewards system;
a user group distribution scheme that is based, at least in part, on at least one user attribute; and/or
a reciprocation scheme that is based, at least in part, on at least one of: one or more peer device sharing rules, and/or a peer device sharing history.

* * * * *